United States Patent [19]

Rollhaus et al.

[11] Patent Number: 4,638,306

[45] Date of Patent: Jan. 20, 1987

[54] KEYBOARD ENTRY SYSTEM

[75] Inventors: Philip Rollhaus, Chicago, Ill.; Yukio Endo, Thornton, N.H.

[73] Assignee: Quixote Corporation, Chicago, Ill.

[21] Appl. No.: 574,894

[22] Filed: Jan. 30, 1984

[51] Int. Cl.$^4$ .......................... G06F 3/02; G08C 9/00
[52] U.S. Cl. .............................. 340/365 R; 340/365 E; 340/365 S; 400/100
[58] Field of Search ........ 340/365 R, 365 E, 365 VL, 340/365 S; 364/709; 179/90 K; 400/100, 101, 102, 91, 92, 93, 87, 88, 110

[56] References Cited

U.S. PATENT DOCUMENTS

| | | |
|---|---|---|
| 3,225,883 | 12/1965 | Ayres . |
| 3,381,276 | 4/1968 | James . |
| 3,597,538 | 8/1971 | Birenbaum . |
| 3,892,915 | 7/1975 | Budworth et al. . |
| 4,042,777 | 8/1977 | Bequaert et al. ............... 340/365 R |
| 4,344,069 | 8/1982 | Prame . |
| 4,360,892 | 11/1982 | Endfield . |
| 4,381,502 | 4/1983 | Prame . |
| 4,502,038 | 2/1985 | Lowenthal et al. ............. 340/365 S |

FOREIGN PATENT DOCUMENTS

| | | |
|---|---|---|
| 0077658 | 4/1983 | European Pat. Off. . |
| 58-72493 | 11/1983 | Japan ............................ 340/365 R |
| 2076743 | 12/1981 | United Kingdom . |

OTHER PUBLICATIONS

Input Text Anytime, Anywhere with Six-Key Word Processor, from Marketing News, published by American Marketing Association, Nov. 25, 1983, vol. 17, No. 24.

Numeric Information Input Equipment, Abstract, vol. 6, No. 198 (P-147) (1076) Oct. 7, 1982, Sanyo Denki K.K.

Primary Examiner—James L. Rowland
Assistant Examiner—T. Rittmaster
Attorney, Agent, or Firm—Willian Brinks Olds Hofer Gilson & Lione Ltd.

[57] ABSTRACT

A keyboard entry system is disclosed which comprises a keyboard which includes a plurality of letter keys, one for each letter of a selected language. The entry system responds to conventional sequential activation of individual keys by providing output signals indicative of the respective individual letters associated with the activated keys to an application program such as a word processor or printer control program. The keyboard entry system also responds to chords of simultaneously activated multiple keys by using these chords to retrieve stored words from a dictionary. It is the stored words rather than the entered chords which are applied as inputs to the application program. This system allows an operator to use both conventional sequential key entry techniques and chorded entry techniques for rapid data entry.

22 Claims, 4 Drawing Figures

KEYBOARD ENTRY SYSTEM

BACKGROUND OF THE INVENTION

The present invention relates to keyboard entry systems and in particular to an improved keyboard entry system which provides increased speed of data entry.

A wide variety of keyboard entry systems have been proposed in the past. Conventional QWERTY typewriter keyboards allow single finger activation of individual keys for single letter entry. Typically, keys are sequentially activated and words are entered letter by letter.

A variant of this conventional keyboard system is one which provides a control key which can be used to indicate that subsequently entered keys are to be treated in special way. For example, sequential depression of a control key and then a number of letter keys may be used to indicate that the letter keys entered subsequently to the control key are to be interpreted as a code indicative of a stored word or phrase.

Other prior art keyboard entry systems have utilized specialized keyboards which react to the simultaneous depression of several keys differently than to the sequential activation of keys. See, for example, Endfield U.S. Pat. No. 4,360,892, Prame U.S. Pat. Nos. 4,344,069 and 4,381,502 and James U.S. Pat. No. 3,381,276. For example, the Prame patents disclose a keyboard entry system in which a twelve-key pad is used. Activation of a single key results in entry of a number, whereas simultaneous activation of multiple keys results in entry of a letter.

Yet another prior art approach is that described in Binenbaum U.S. Pat. No. 3,597,538 and Budworth U.S. Pat. No. 3,892,915. Both of these systems relate to devices for use with data generated by a stenographic keyboard.

Ayres U.S. Pat. No. 3,225,883 discloses an entry system in which multiple keys are simultaneously depressed in order to enter multiple characters constituting a syllable or word. In the Ayres system, certain letters are entered by simultaneous depression of adjacent keys by a single finger of the user.

Bequaert U.S. Pat. No. 4,042,777 discloses a variant on the specialized keyboard approach. The Bequaret patent disclses a one hand keyboard which relies on simultaneous depression of one or more keys to indicate individual letters. In addition, Bequaert teaches that stored words may be retrieved by means of coded chords which do not correspond to any individual letter. Thus, when a coded chord is entered, the system disclosed by Bequaert retrieves the stored word associated with the specific chord and enters the stored word rather than the chord itself. The Bequaret system requires the simultaneous depression of two or four keys in order to entry a number of separate letters. Thus, each chorded entry must be checked to determine whether it is a letter chord indicative of a discrete letter or a coded chord indicative of a stored word. In certain applications, this need to check each chorded entry can slow the operation of the entry system to an undesirable degree. Furthermore, the Bequaert system requires an operator to learn a new entry format which differs fundamentally from that of the standard QWERTY keyboard in common use.

SUMMARY OF THE INVENTION

The present invention is directed to an improved keyboard entry system, which does not require extensive operator retraining, and which can improve the speed and accuracy of keyboard data entry.

According to this invention, a keyboard entry system for a language comprised of a plurality of letters is provided which includes a keyboard. This keyboard comprises a plurality of letter keys, each associated with a respective letter. First means are provided for generating keying signals in response to activation of the letter keys. Second means are provided for generating output signals in response to the keying signals. This second means includes means for storing a list of stored texts, each of which is associated with a respective stored index. Means, responsive to single finger activation of the letter keys, operate to set the output signal to the letters corresponding to the activated ones of the letter keys. In addition, means, responsive to near simultaneous, multiple finger activation of the letter keys, operate to classify the corresponding keying signals as a key chord. Means are provided for comparing the key chords with the stored indexes and for selecting the corresponding ones of the stored texts in the event the key chord matches one of the stored indexes, along with means for setting the output signal to correspond with the selected stored text. The keyboard and first and second means cooperate automatically to set the output signal to correspond to associated ones of the letters in response to single finger activation of the letter keys, and to set the output signal to correspond to an associated one of the stored texts in response to multiple finger activation of the letter keys.

This invention provides the important advantage that the keyboard can be used for conventional single letter entry without retraining the operator. Thus, the keyboard is fully usable in its conventional, sequential letter entry mode by an operator of conventional skills. To the extent the operator is trained and interested in using the advanced entry features of this invention, the operator can simply enter chords which are decoded as one of a number of stored words, phrases, or the like. As the skills of the operator increase, and the operator learns a greater and greater number of chords, the operator can obtain greater and greater benefit from this invention. These important advantages are achieved without interrupting or disturbing in any way sequential data entry. For this reason, an operator can use the data entry system of this invention in the convention manner without any additional instruction whatsoever and the operator can gradually make use of the advanced features of this invention in a progressive manner as the operator's data entry skills increase.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
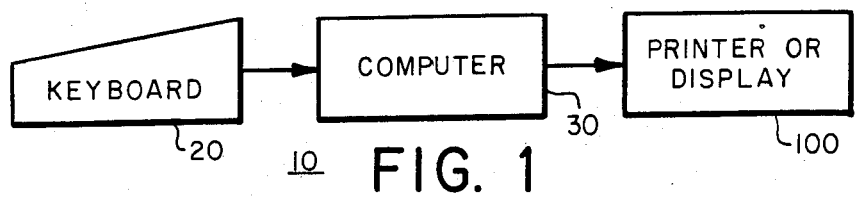
FIG. 1 is a block diagram showing a presently preferred embodiment of this invention.

Turning now to the drawings, FIG. 1 shows a schematic representation of a keyboard entry system 10 which incorporates a presently preferred embodiment of this invention. The keyboard entry system 10 includes a keyboard 20, a computer 30 and an output device such a printer or CRT display 100.

Figure 2:
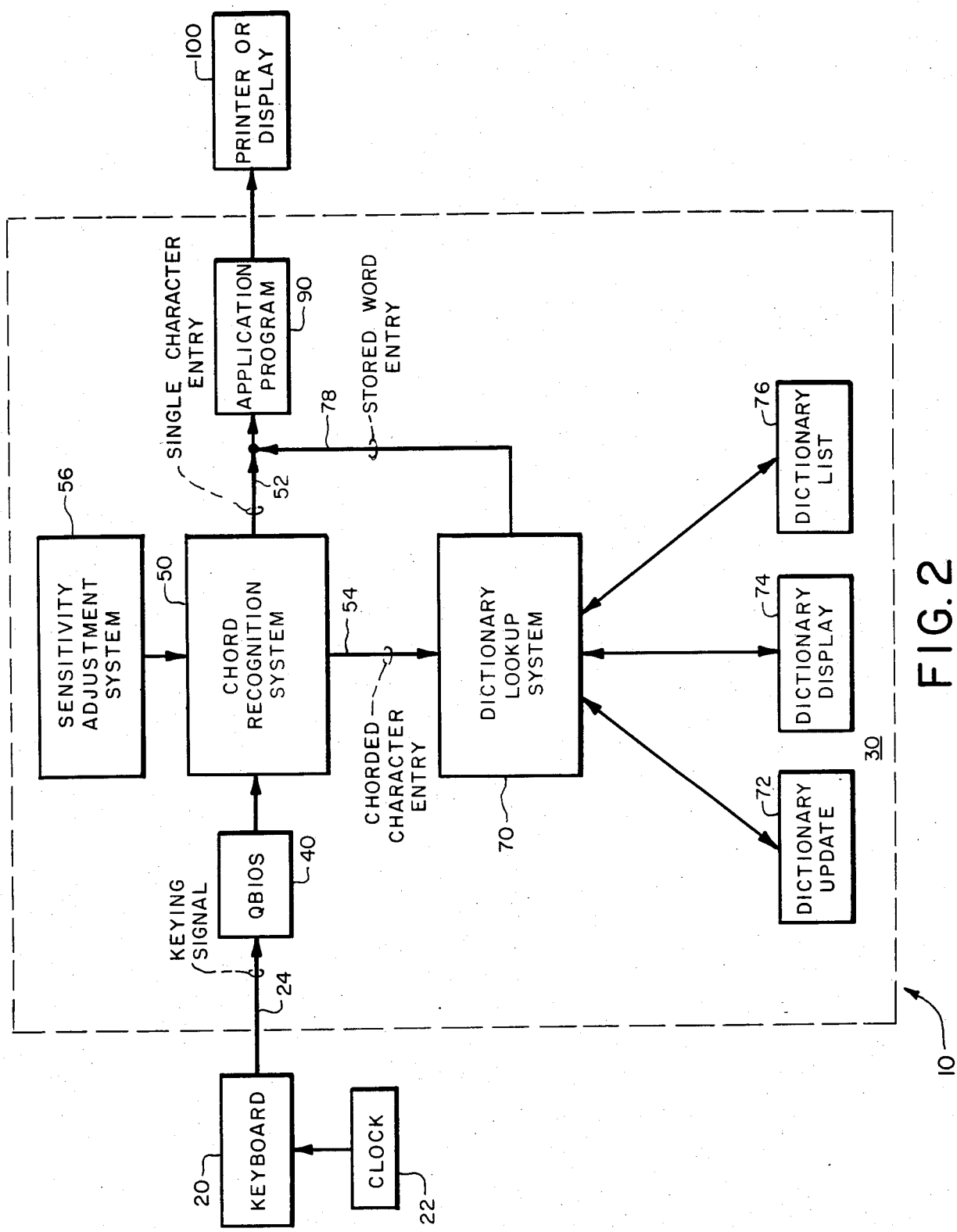
FIG. 2 is a more detailed schematic representation of the embodiment of FIG. 1.

FIG. 2 shows a more detailed block diagram of the system 10 of FIG. 1. As shown in FIG. 2, the keyboard 20 is coupled to a clock 22, and the keyboard 20 operates to generate keying signals which are applied to the computer 30 via a cable 24. Mechanically, the keyboard 20 is a conventional QWERTY keyboard such as that distributed by Amkey Corporation as part No. DIN-106 which includes a separate letter key for each of the 26 letters of the Roman alphabet. However, the keyboard 20 differs from the conventional Amkey keyboard described above, in that the read only memory included in the keyboard 20 has been reprogrammed with the programmed shown in Appendix A. The standard Amkey DIN-106 generates a eight-bit keystroke scan code in response to each depression or release of a key included on the keyboard. One bit of this eight-bit keystroke scan code designates whether the key stroke corresponds to the depression or release of a key, and the other seven bits operate to identify the key.

The revised software included in Appendix A causes the keyboard 20 to differ from the standard Amkey DIN-106 keyboard, in that the keyboard 20 generates a keying signal in response to the activation of each key in the following format: fddddddd ttttttt ttttttt, where f indicates the key depress/release flag, d indicates a key code bit and t indicates a time code bit. The first eight bits of this 24-bit keying signal correspond to the conventional eight-bit keystroke scan code described above. That is, the most significant bit indicates whether the activated key has been depressed or released, and the remaining seven bits constitute a key code which identifies the key activated. The remaining 16 bits of the keying signal on cable 24 constitute a time code. In this embodiment, the clock 22 generates a clock pulse every seven milliseconds, and the 16-bit time code included in the keying signal on the cable 24 is simply a binary count of clock pulses generated by the clock 22. Thus, the 16-bit time code is a measure of the relative time of depression or release of the associated key, measured with a resolution of seven milliseconds.

In this preferred embodiment, the computer 30 is an IBM PC computer having 256 K of random access of memory and supplied with the PCDOS 2.0 disk operating system and the standard MSPASCAL complier. Both PCDOS 2.0 and MSPASCAL are conventional programs known to those skilled in the art which will not be described in detail here. The standard PCDOS 2.0 includes a module called BIOS which performs initial processing of keyboard entries.

In the embodiment of FIGS. 1 and 2, the conventional BIOS routine is replaced by a modified routine termed QBIOS, shown at reference number 40 in FIG. 2. QBIOS operates in much the same manner as the conventional BIOS routine in decoding the key code included in the first eight bits of the keying signal on cable 24 to obtain the ASCII code corresponding to the activated key on the keyboard 20. However, in addition the QBIOS routine stores the 16-bit time code included in the keying signal in association with the decoded key code. Appendix B provides a listing of QBIOS as implemented in this embodiment.

In this embodiment QBIOS is stored in RAM and the pointer in the Interrupt Vector Table is modified such that keyboard generated interrupts are directed to QBIOS in RAM instead of to BIOS in ROM.

The output of the QBIOS routine is an ASCII code indicative of the key activated, an indication of the whether the activated key has been released or depressed, and the time code indicative of the relative time of activation. This information is supplied to a chord recognition system 50. The chord recognition system 50 is discussed below in greater detail in conjunction with FIG. 3. Here is enough to state that the chord recognition system 50 classifies each of the activated letter keys either (1) as a discrete key which has been activated in sequence with other keys, or (2) as part of a key chord. As used herein the term "key chord" is used to designate a plurality of letter keys which are activated nearly simultaneously or in an overlapping manner. For example, the chord recognition system 50 distinguishes between the letters Q and X when activated sequentially and the letters QX when activated as a chord.

Those keys recognized by the chord recognition system 50 as single character entries are passed as output signals via data path 52 to an application program 90. The application program 90 can be a suitable program such as a printer or display control program or a word processor program for example.

Key chords recognized by the chord recognition system 50 are passed to a dictionary lookup system 70 via path 50. The dictionary lookup system 70 serves to store a list of stored texts. As used herein, the term "stored text" is used in its broad sense to encompass stored words, syllables, acronyms, phrases, sentences, and the like. Each of the stored texts included in the dictionary lookup system 70 is associated with a respective stored index. Table 1 shows an illustrative listing of a portion of the stored words and stored indexes which may be included in the dictionary lookup system 70.

TABLE 1

| Index | Stored Text |
| --- | --- |
| qx | Quixote Corporation |
| hr | however |
| fe | furthermore |
| ns | nevertheless |
| us | United States |
| asc | acetylsalicylic acid |

The dictionary look-up system 70 includes a dictionary update routine 72 which allows a user to add new stored texts and stored indexes to the dictionary lookup system 70. A dictionary display routine 74 allows the contents of the dictionary lookup system 70 to be displayed on a CRT. A dictionary list routine 76 allows the stored texts and indexes in the dictionary lookup system 70 to be printed.

The dictionary lookup system 70 and the routines 72,74,76 are standard systems well known to those skilled in the art. A variety of approaches can be used to implement the dictionary lookup system 70, but in this preferred embodiment a table lookup type dictionary is used. That is, each stored index is associated with a pointer which points to the beginning of the corresponding stored text. Each stored text is of variable length and extends to an end of text symbol such as a byte equal to zero. The output of the dictionary lookup system 70 is the one of the stored texts associated with the stored index that corresponds to the key chord supplied by the chord recongition system. This stored text output is supplied as an output signal via path 78 to the application program 90.

The embodiment of FIG. 2 operates to transmit discrete letters directly to the application program 90 and to use near simultaneous character entries as chords to retrieve associated ones of the stored texts from the dictionary lookup system 70, which are also supplied as inputs to the application program 90. If the application program 90 is, for example, a simple printer control program, then the application program 90 controls the printer 100 to cause both single character entries supplied via path 52 and stored text entries supplied via path 78 to be printed in sequence on the printer 100. Similarly, if the application program 90 is a word processing program, it operates to enter both single character entries and stored text entries into the document being created. The application program 90 does not per se form any part of this invention, and those skilled in the art will be aware of a wide variety of programs suitable for use with this invention. For this reason, the application program 90 will not be described in further detail here.

Figure 3:
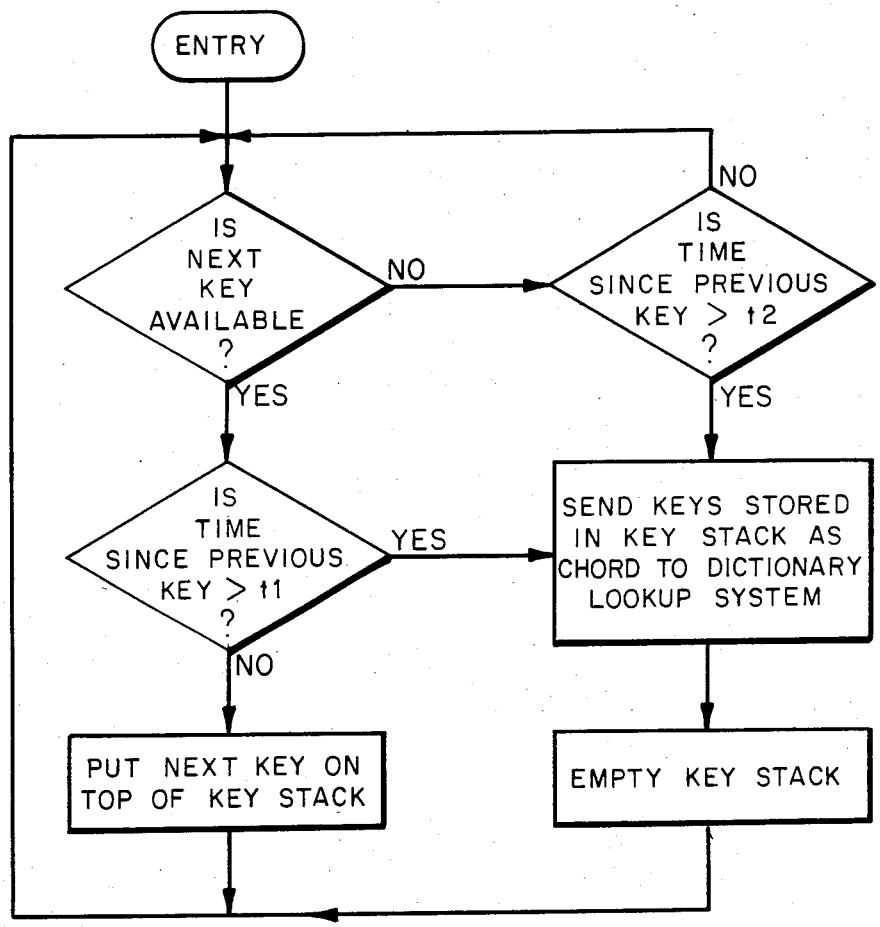
FIG. 3 is a flowchart of the chord recognition system of FIG. 2.

FIG. 3 shows a more detailed flowchart of the chord recognition system first checks to see if a next key is available from QBIOS, as indicated by key release. If not, the action taken depends on the elapsed time since the previous key. If this elapsed time is less than t2, no action is taken. If this elapsed time is greater than t2, then the keys stored in the key stack are sent as a chord to the dictionary lookup system 70 and the key stack is cleared. if a next key is available from QBIOS, the system 70 then checks to determine whether the time code of the next key is more than t1 greater than the time code of the previous key. If not, the next key is put on top of the key stack; if so, the keys stored in the key stack are sent as a chord to the dictionary lookup system 70 and the key stack is cleared.

The sensitivity adjustment system 56 of FIG. 2 allows adjustment of t1 and t2 such that chords are recognized and reliably distinguished from standard sequential key entry. Preferably, this adjustment in t1 and t2 is made by the operator. For example, up and down keys may be provided to allow an operator to increase or decrease the value of t1 and t2 as desired. For many applications a value of t1 and t2 of less than 50 milliseconds will be appropriate. It is anticipated that a value of t1 in the range of 15–30 milliseconds may be suitable for some typists.

Figure 4:
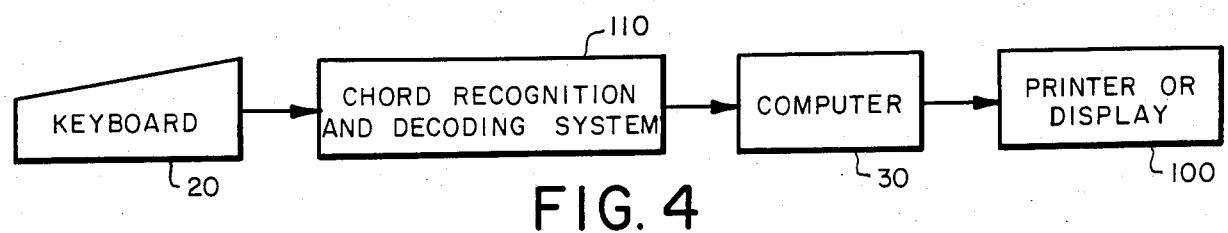
FIG. 4 is a schematic diagram showing a second preferred embodiment of this invention.

Of course, it should be understood that the arrangement of components shown in FIG. 1 is merely one of several alternative embodiments of this invention. In the system of FIG. 1, the clock 22 can either be included in the keyboard 20 as shown in FIG. 2 or it can alternatley be included in the computer 30. In a second preferred embodiment of this invention, as shown in FIG. 4, the entire chord recognition and decoding system 110 is included in a separate module which is interposed between the keyboard 20 and computer 30. This approach may be preferable in applications where preexisting keyboards and computers are to be updated and provided with the enhanced chorded entry features of this invention. In the embodiment of FIG. 4, the clock (not shown) used to measure the relative times of key activation can be included either in the keyboard 20 or in the chord recognition and decoding system 110. In princi- ple, the embodiment of FIG. 4 operates identically to that of FIG. 1. The only difference is in the hardware, and particularly in the module 110 which includes the chord recognition system 50 and the dictionary lookup system 70, along with associated routines 56,72,74,76 of FIG. 2.

From the foregoing, it should be apparent that an improved keyboard entry system has been described which provides particularly high data input rates. The system of this invention avoids the need for a separate control key to flag the entry of an abbreviation. Because the embodiments described above recognize a single key entry as indicative of a conventional single character and multiple chorded key entry as indicative of a code to be compared against stored indexes in the dictionary lookup system, these embodiments operate in a particularly fast and simple manner. An important feature of these embodiments is that because all chorded character entries but no single character entries are compared with stored indexes in the dictionary, the need to check every keyboard entry against the dictionary is avoided. This speeds the execution of these embodiments.

Another important advantage of this invention is that the entry of chorded keys is a fast, efficient way to allow an operator to enter an index code into the system. As explained above, the preferred embodiments described above can readily be used by an untrained operator, because the keyboard operates in the conventional single character entry mode without changes of any sort. To the extent the operator is capable of and interested in using the advanced chorded entry features of these embodiments, the operator can do so in a natural, progressive, and unstructed manner. Thus, the same keyboard entry system can be used by a range of operators with varying skills. Minimally skilled operators may use only the conventional single character entry features of the keyboard entry system, whereas more skilled operators can take full advantage of both the single character and the chorded character entry modes of the invention. Furthermore, an operator can readily customize the dictionary lookup system to include new stored texts and associated stored indexes, depending upon the individual preferences of the operator or the needs of an individual project.

Of course, it should be understood that a wide range of changes and modifications can be made to the preferred embodiments described above. For example, the preferred embodiments described above recognize a chorded character entry by analyzing the times of release of individual keys. In alternative embodiments, it may be, preferable to use the times of key depression either as a substitute for or in conjunction with the time of key to determine chorded character entries. In this specification and the following claims, the term "key activation" has been used in its broad sense to encompass either key depression or key release, or both.

Furthermore, the term "single finger activation" is used herein to denote patterns of one or more key activations achieved by use of a single finger by the operator. Thus, in some embodiments of this invention, single finger activation techniques may be used to activate two adjacent keys.

It is intended that the foregoing detailed description be regarded as illustrative rather than limiting, and that it be understood that it is the following claims, including all equivalents, which are intended to define the scope of this invention.

APPENDIX A

ASMB-48 DEVELOPMENT SYSTEM

```
0000                    ; TITLE 'Q-4-106'
0000                    ; RELEASED 8/4/83
0000                    ; DIN-106        Q-4-106
0000                    ;
0000                    ; RAM MAP: 48/63   KEY BIT MAP
0000                    ;
0000                    ;  R7 LAST DEPRESSION CODE OUT
0000                    ;  R6 DEBOUNCE COUNTER
0000                    ;  R5 STATUS REGISTER
0000                    ;  R4 REPEAT TIMER
0000                    ;  R3 LAST KEY DOWN
0000                    ;  R2 KEY POINTER
0000                    ;  R1 MASK REGISTER
0000                    ;  R0 BIT MAP POINTER
0000                    ;  F0 REPEAT ENABLE
0000                    ;
0000                    ; RAM BANK 1
0000                    ;
0000                    ;  R7 BUFFER FIRST OUT
0000                    ;  R6
0000                    ;  R5
0000                    ;  R4
0000                    ;  R3
0000                    ;  R2
0000                    ;  R1 LOCAL SCRATCH REGISTER
0000                    ;  R0 TOP OF BUFFER POINTER
0000                    ;
0000                    ;  R1F / R30 CHARACTER BUFFER
0000                    ;  R31 / R3F KEY STATUS REGISTERS
0000                    ;
0000                    ; I/O MAP TO "KEY" INPUT
0000                    ;  PORT 1 BITS 0/6 - KEY ADDRESS
0000                    ;  PORT 1 BIT 7 - HYSTERESIS
0000                    ;  PORT 2 BIT 4 - SERIAL DATA OUT
0000                    ;  PORT 2 BIT 7 - SERIAL CLOCK OUT
0000                    ;  PORT 2 BITS 5/6 - LED
0000                    ;
0000                    ; T1 CLOCK INPUT
0000                    ; I DATA INPUT
0000                    ; F1 BUFFER NOT EMPTY FLAG
0000                    ;
0000   00       M00      NOP
0001   C5                SEL     RB0
0002   15                DIS     I
0003   35                DIS     TCNT
0004   E5                SEL     MB0
0005   A5                CLR     F1
0006                  ;
0006                  ; INITIALIZE P2: LEDS OFF, CLOCK HIGH, DATA LOW
0006                  ;
0006   2380              MOV     A,#080H
0008   3A                OUTL    P2,A
0009   27                CLR     A
000A   02                OUTL    BUS,A
000B   85                CLR     F0    ;DISABLE AUTO-REPEAT
000C                  ;
000C                  ; CLEAR ALL RAM REGISTERS
000C                  ;
000C   27                CLR     A
000D   B83F              MOV     R0,#3FH
000F   A0       MOD      MOV     @R0,A
0010   E80F              DJNZ    R0,MOD
0012   27       M10      CLR     A
0013   62                MOV     T,A
0014   55                STRT    T
0015                  ;
```

ASMB-48 DEVELOPMENT SYSTEM

```
0015                    ; DELAY TO BEGINNING OF SCAN
0015                    ;
0015   041D    START    JMP     M26
0017   5438    INCR0    CALL    M235    ;TEST FOR HOST COM
0019   18               INC     R0      ;INCREMENT BMP
001A   F8               MOV     A,R0
001B   B255             JB      5,MASK  ;TEST SCAN COMPLETE
001D            ;
001D            ; SERVICE AUTO REPEAT FUNCTION
001D            ;
001D   42      M26      MOV     A,T
001E   034D             ADD     A,#4DH
0020   E61D             JNC     M26
0022   27               CLR     A
0023   62               MOV     T,A
0024   D5               SEL     RB1
0025   2301             MOV     A,#1    ;MAINTAIN TIMER IN R5,R6
0027   6D               ADD     A,R5
0028   AD               MOV     R5,A
0029   27               CLR     A
002A   7E               ADDC    A,R6
002B   537F             ANL     A,#07FH
002D   AE               MOV     R6,A
002E   C5      SETUP    SEL     RB0
002F   B633             JF0     REP     ;AUTO-REPEAT ENABLED?
0031   043A             JMP     NOREP
0033   EC3A    REP      DJNZ    R4,NOREP ;TIME TO AUTO-REPEAT?
0035   BC10             MOV     R4,#10H
0037   FF               MOV     A,R7    ;GET LAST CODE OUT
0038   5403             CALL    BUFFER
003A   23F7    NOREP    MOV     A,#0F7H
003C   39               OUTL    P1,A
003D   B831             MOV     R0,#31H ;BIT MAP POINTER
003F   BE01             MOV     R6,#01H ;BIT MASK REGISTER
0041   AA               MOV     R2,A    ;KEY ADDRESS
0042   A3               MOVP    A,@A    ;DELAY
0043   A3               MOVP    A,@A
0044   FE               MOV     A,R6    ;LOAD MASK
0045   50               ANL     A,@R0   ;TEST HISTORY
0046   9659             JNZ     HIST1   ;KEY WAS DOWN
0048   A3      HIST0    MOVP    A,@A    ;DELAY
0049   3674             JT0     COD     ;TEST KEY
004B   CA      FALSE    DEC     R2
004C   FA               MOV     A,R2    ;NEXT ADDRESS
004D   39               OUTL    P1,A    ;OUTPUT NEXT ADDRESS
004E   FE      SCAN     MOV     A,R6    ; ROTATE MASK
004F   E7               RL      A
0050   AE               MOV     R6,A
0051   1217             JB      0,INCR0 ; TEST FOR BYTE DONE
0053   A3               MOVP    A,@A
0054   A3               MOVP    A,@A
0055   FE      MASK     MOV     A,R6
0056   50               ANL     A,@R0   ; TEST HISTORY
0057   C648             JZ      HIST0   ; KEY NOT DOWN LAST SCAN
0059   997F    HIST1    ANL     P1,#7FH ; KEY DOWN LAST SCAN
005B   A3               MOVP    A,@A    ;DELAY
005C   A3               MOVP    A,@A
005D   2661             JNT0    COR     ;TEST KEY
005F   044B             JMP     FALSE
0061            ;
0061   FE      COR      MOV     A,R6    ;RESET KEY BIT
0062   37               CPL     A
0063   50               ANL     A,@R0
0064   A0               MOV     @R0,A
0065   FA      RELEAS   MOV     A,R2
0066   537F             ANL     A,#7FH
0068   E3               MVP3    A,@A
0069   4380             ORL     A,#80H  ;SEND RELEASE CODE
006B   5403             CALL    BUFFER
```

ASMB-48 DEVELOPMENT SYSTEM

```
006D  FB              MOV     A,R3    ;IS THIS LAST KEY DOWN?
006E  DA              XRL     A,R2
006F  963A            JNZ     NOREP
0071  85              CLR     F0      ;DISABLE AUTO-REPEAT
0072  043A            JMP     NOREP
0074  A3      COD     MOVP    A,@A
0075  A3              MOVP    A,@A
0076  264B            JNT0    FALSE
0078  FE      COD2    MOV     A,R6    ;SET KEY BIT
0079  40              ORL     A,@R0
007A  A0              MOV     @R0,A
007B  BC54            MOV     R4,#54H ;INITIALIZE TIMER
007D  85              CLR     F0      ;ENABLE AUTO-REPEAT
007E  95              CPL     F0
007F  FA              MOV     A,R2
0080  AB              MOV     R3,A    ;SAVE LAST KEY ADX
0081  B938            MOV     R1,#38H
0083  F1              MOV     A,@R1
0084  12A6            JB      0,NOTCAP ;TEST FOR CONTROL
0086  FA              MOV     A,R2    ;GET XY CODE
0087  D3A7            XRL     A,#0A7H ;TEST FOR NUM LOCK
0089  969B            JNZ     TSTCAP
008B  FD      NUML    MOV     A,R5
008C  4380            ORL     A,#80H
008E  D320            XRL     A,#20H
0090  AD              MOV     R5,A
0091  3A              OUTL    P2,A
0092  FA              MOV     A,R2
0093  537F            ANL     A,#7FH
0095  E3              MVP3    A,@A    ;GET CODE ON DEPRESSION
0096  AF              MOV     R7,A    ;SAVE DEPRESSION CODE
0097  7479            CALL    BUFFR1
0099  041D            JMP     M26
009B  D34F    TSTCAP  XRL     A,#4FH
009D  96A6            JNZ     NOTCAP
009F  FD      CAPSL   MOV     A,R5
00A0  4380            ORL     A,#80H
00A2  D340            XRL     A,#40H
00A4  AD      OUTP2   MOV     R5,A
00A5  3A              OUTL    P2,A
00A6  FA      NOTCAP  MOV     A,R2
00A7  537F            ANL     A,#7FH
00A9  E3              MVP3    A,@A    ;GET CODE ON DEPRESSION
00AA  AF              MOV     R7,A    ;SAVE DEPRESSION CODE
00AB  5403    SEND    CALL    BUFFER
00AD  044B            JMP     FALSE
00AF  A3      ME4     MOVP    A,@A
00B0  69      ME5     ADD     A,R1
00B1  A9              MOV     R1,A
00B2  F8              MOV     A,R0
00B3  83              RET
00B4                  ORG     100H
0100            ;
0100            ; MICRO COMPUTER SELF TEST
0100            ;
0100  C5      M100    SEL     RB0
0101  15              DIS     I
0102  35              DIS     TCNT
0103  E5              SEL     MB0
0104  85              CLR     F0
0105  A5              CLR     F1
0106  27              CLR     A
0107  B83F            MOV     R0,#3FH
0109            ;
0109            ; CHECK ALL REGISTERS
0109            ;
0109  37      M109    CPL     A
010A  A0              MOV     @R0,A
```

ASMB-48 DEVELOPMENT SYSTEM

```
010B  D0              XRL     A,@R0
010C  962B            JNZ     M128
010E  A0              MOV     @R0,A
010F  D0              XRL     A,@R0
0110  962B            JNZ     M128    ;IN CASE OF ERROR
0112  E809            DJNZ    R0,M109 ;DON'T SEND 0AAH
0114          ;
0114          ; TEST CHECKSUM OF ROM
0114          ;
0114  F8      M114    MOV     A,R0
0115  A3              MOVP    A,@A
0116  14B0            CALL    ME5
0118  E3              MVP3    A,@A
0119  14B0            CALL    ME5
011B  14AF            CALL    ME4
011D  5400            CALL    M200
011F  E814            DJNZ    R0,M114
0121  F9              MOV     A,R1
0122          ; JNZ M128
0122  23AA            MOV     A,#0AAH
0124  7479            CALL    BUFFR1  ;PUT 0AAH ON BUFFER
0126  C5              SEL     RB0
0127  BD80            MOV     R5,#80H
0129  FD              MOV     A,R5
012A  3A              OUTL    P2,A
012B  0412    M128    JMP     M10
012D                  ORG     200H
0200          ;
0200          ; ROM CHECKSUM CHECK
0200          ;
0200  A3      M200    MOVP    A,@A
0201  04B0            JMP     ME5
0203          ;
0203          ; POST OUTPUT BUFFER HANDLER
0203          ;
0203          ; BUFFER INPUT HANDLER
0203          ;
0203  D5      BUFFER  SEL     RB1
0204  7609            JF1     M226    ;BUFFER EMPTY?
0206  B820            MOV     R0,#20H ;INITIALIZE BUFFER
0208  B5              CPL     F1      ;BUFFER INITIALIZED
0209  A9      M226    MOV     R1,A    ;SAVE CHARACTER IN R1
020A  F8              MOV     A,R0    ;
020B  D330            XRL     A,#30H  ;BUFFER FULL?
020D  C637            JZ      M234    ;
020F  07              DEC     A       ;BUFFER ONE CHAR FROM FULL?
0210  9614            JNZ     M231
0212  B9FF            MOV     R1,#0FFH ;REPORT BUFFER OVERFLOW
0214  F9      M231    MOV     A,R1    ;PUT CHARACTER IN BUFFER
0215  A0              MOV     @R0,A
0216  18              INC     R0
0217  C5              SEL     RB0
0218  FD              MOV     A,R5
0219  B21C            JB      5,TIMER
021B  93              RETR
021C  D5      TIMER   SEL     RB1
021D  F8              MOV     A,R0    ;
021E  D330            XRL     A,#30H  ;BUFFER FULL?
0220  C637            JZ      M234    ;
0222  07              DEC     A       ;BUFFER ONE CHAR FROM FULL?
0223  9627            JNZ     M232
0225  B9FF            MOV     R1,#0FFH ;REPORT BUFFER OVERFLOW
0227  FD      M232    MOV     A,R5    ;PUT CHARACTER IN BUFFER
0228  A0              MOV     @R0,A
0229  18              INC     R0
022A  F8              MOV     A,R0    ;
022B  D330            XRL     A,#30H  ;BUFFER FULL?
022D  C637            JZ      M234    ;
```

ASMB-48 DEVELOPMENT SYSTEM

```
022F  07              DEC    A    ;BUFFER ONE CHAR FROM FULL?
0230  9634            JNZ    M233
0232  B9FF            MOV    R1,#0FFH  ;REPORT BUFFER OVERFLOW
0234  FE       M233   MOV    A,R6  ;PUT CHARACTER IN BUFFER
0235  A0              MOV    @R0,A
0236  18              INC    R0
0237  93       M234   RETR
0238                  ;
0238                  ; TEST FOR HOST COMMUNICATION
0238                  ;
0238  D5       M235   SEL    RB1
0239                  ;
0239                  ; IF CLOCK IS LOW, HOST IS ATTEMPTING COMMUNICATIONS
0239                  ;
0239  469C            JNT1   M287
023B                  ;
023B                  ; IF FLAG 1 IS SET, ??
023B                  ;
023B  763E            JF1    M23D
023D  93              RETR
023E                  ;
023E                  ; IF F1 IS SET, SEND A CHARACTER
023E                  ;
023E  B920     M23D   MOV    R1,#20H  ;R1 = 1ST CHAR
0240  F1              MOV    A,@R1  ;GET CHAR
0241  97              CLR    C
0242  A7              CPL    C
0243  F7              RLC    A    ;USE CARRY FOR BIT BUFFER
0244  469C            JNT1   M287  ;HOST COMM?
0246  9A7F            ANL    P2,#07FH  ;SEND DATA
0248  8A10            ORL    P2,#10H
024A  00              NOP
024B  00              NOP
024C  B90E            MOV    R1,#0EH
024E  8654     M24D   JNI    M253  ;WAIT FOR HANDSHAKE
0250  8656            JNI    M255
0252  445D            JMP    M25C
0254  4456     M253   JMP    M255
0256  E94E     M255   DJNZ   R1,M24D
0258  8A80            ORL    P2,#80H  ;HOST NOT READY, RESTORE
025A  9AEF            ANL    P2,#0EFH
025C  93              RETR
025D  B909     M25C   MOV    R1,#09H  ;DELAY
025F  00              NOP
0260  E960     M25F   DJNZ   R1,M25F
0262  BA09            MOV    R2,#09H  ;SEND 9 BITS
0264  B90A     M263   MOV    R1,#0AH  ;PREPARE FOR DELAY
0266  1270            JB     0,M26D  ;TEST BIT
0268  9AEF            ANL    P2,#0EFH  ;SEND A ZERO
026A  00              NOP
026B  00              NOP
026C  8A80            ORL    P2,#80H
026E  4478            JMP    M273
0270  8A10     M26D   ORL    P2,#010H  ;SEND A ONE
0272  00              NOP
0273  00              NOP
0274  8A80            ORL    P2,#80H
0276  4478            JMP    M273
0278  E978     M273   DJNZ   R1,M273  ;DELAY
027A  00              NOP
027B  9A7F            ANL    P2,#07FH
027D  67              RRC    A    ;SHIFT NEXT BIT
027E  EA64            DJNZ   R2,M263  ;ALL BITS SENT?
0280  9AEF            ANL    P2,#0EFH  ;
0282  00              NOP
0283  00              NOP
0284  00              NOP
0285  00              NOP
0286  00              NOP
```

ASMB-48 DEVELOPMENT SYSTEM

```
0287  8A80              ORL    P2,#80H   ;RESTORE P2
0289  F8       M203     MOV    A,R0
028A  A9                MOV    R1,A
028B  07                DEC    A
028C  A8                MOV    R0,A      ;UPDATE INPUT BUFFER POINTER
028D  D320              XRL    A,#20H    ;TEST FOR BUFFER EMPTY
028F  9693              JNZ    M20E      ;BUFFER NOT EMPTY
0291  A5                CLR    F1        ;REINITIALIZE BUFFER
0292  93       M20D     RETR
0293           ;
0293           ; BYTE SHIFT ALL CHARACTERS IN BUFFER
0293           ;
0293  F9       M20E     MOV    A,R1
0294  03E1              ADD    A,#0E1H   ;CALCULATE NUMBER OF BYTES
0296  AA                MOV    R2,A
0297  21       SHIFTL   XCH    A,@R1
0298  C9                DEC    R1
0299  EA97              DJNZ   R2,SHIFTL
029B  93       M286     RETR
029C           ;
029C           ; DELAY, CHECK HOST COMM
029C           ;
029C  2300     M287     MOV    A,#0
029E  B908              MOV    R1,#08H
02A0  E9A0     M289     DJNZ   R1,M289
02A2  569B              JT1    M286
02A4           ;
02A4           ; RECEIVE HOST COMMUNICATION
02A4           ; CLOCK 0, DATA 1, DELAY
02A4           ;
02A4  9A7F              ANL    P2,#07FH
02A6  8A10              ORL    P2,#010H
02A8  B911              MOV    R1,#11H
02AA  E9AA     M293     DJNZ   R1,M293
02AC           ;
02AC           ; RECEIVE 9 BITS
02AC           ;
02AC  BA09              MOV    R2,#09H
02AE           ;
02AE           ; CLOCK 1, DELAY
02AE           ;
02AE  8A80     M297     ORL    P2,#80H
02B0  B908              MOV    R1,#08H
02B2  E9B2     M29B     DJNZ   R1,M29B
02B4           ;
02B4           ; CLOCK 0, TEST DATA LINE
02B4           ;
02B4  9A7F              ANL    P2,#07FH
02B6  86C1              JNI    M2AA
02B8  4301              ORL    A,#01H
02BA  86C5              JNI    M2AE
02BC  67       M2A5     RRC    A
02BD  EAAE              DJNZ   R2,M297
02BF  44C8              JMP    M2B1
02C1  53FE     M2AA     ANL    A,#0FEH
02C3  86BC              JNI    M2A5
02C5  00       M2AE     NOP
02C6  44BC              JMP    M2A5
02C8           ;
02C8           ; CLOCK = 1, DELAY
02C8           ;
02C8  8A80     M2B1     ORL    P2,#080H
02CA  B905              MOV    R1,#05H
02CC  E9CC     M2B5     DJNZ   R1,M2B5
02CE           ;
02CE           ; DATA = 0,
02CE           ;
02CE  9AEF              ANL    P2,#0EFH
02D0  37                CPL    A
```

ASMB-48 DEVELOPMENT SYSTEM

```
02D1  969B           JNZ      M286
02D3  E69B           JNC      M286
02D5  2400           JMP      M100
02D7                 ORG      300H
0300          ;
0300          ;     CODE TABLES
0300          ;
0300  62      T00A   DB       98    ;XY 80 KEY 15
0301  63             DB       99    ;XY 81 KEY 16
0302  64             DB       100   ;XY 82 KEY 17
0303  61             DB       97    ;XY 83 KEY 14
0304  68             DB       104   ;XY 84 KEY 21
0305  65             DB       101   ;XY 85 KEY 18
0306  67             DB       103   ;XY 86 KEY 20
0307  66             DB       102   ;XY 87 KEY 19
0308  1A             DB       26    ;XY 88 KEY 53
0309  1B             DB       27    ;XY 89 KEY 54
030A  29             DB       41    ;XY 8A KEY 55
030B  00             DB       0     ;XY 8B KEY
030C  4A             DB       74    ;XY 8C KEY 59
030D  47             DB       71    ;XY 8D KEY 56
030E  49             DB       73    ;XY 8E KEY 58
030F  48             DB       72    ;XY 8F KEY 57
0310  28      T10A   DB       40    ;XY 90 KEY 73
0311  00             DB       0     ;XY 91 KEY
0312  1C             DB       28    ;XY 92 KEY 74
0313  27             DB       39    ;XY 93 KEY 72
0314  4E             DB       78    ;XY 94 KEY 78
0315  4B             DB       75    ;XY 95 KEY 75
0316  4D             DB       77    ;XY 96 KEY 77
0317  4C             DB       76    ;XY 97 KEY 76
0318  35             DB       53    ;XY 98 KEY 92
0319  36             DB       54    ;XY 99 KEY 93 SHIFT
031A  37             DB       55    ;XY 9A KEY 94
031B  34             DB       52    ;XY 9B KEY 91
031C  1C             DB       28    ;XY 9C KEY 98
031D  4F             DB       79    ;XY 9D KEY 95
031E  51             DB       81    ;XY 9E KEY 97
031F  50             DB       80    ;XY 9F KEY 96
0320  0C      T20A   DB       12    ;XY A0 KEY 35
0321  0D             DB       13    ;XY A1 KEY 36
0322  0E             DB       14    ;XY A2 KEY 37
0323  0B             DB       11    ;XY A3 KEY 34
0324  46             DB       70    ;XY A4 KEY 39
0325  00             DB       0     ;XY A5 KEY
0326  0A             DB       10    ;XY A6 KEY 33
0327  45             DB       69    ;XY A7 KEY 38 NUM
0328  00             DB       0     ;XY A8 KEY
0329  00             DB       0     ;XY A9 KEY
032A  09             DB       9     ;XY AA KEY 32
032B  07             DB       7     ;XY AB KEY 30
032C  00             DB       0     ;XY AC KEY
032D  00             DB       0     ;XY AD KEY
032E  00             DB       0     ;XY AE KEY
032F  08             DB       8     ;XY AF KEY 31
0330  2E      T30A   DB       46    ;XY B0 KEY 85
0331  2D             DB       45    ;XY B1 KEY 84
0332  2C             DB       44    ;XY B2 KEY 83
0333  2F             DB       47    ;XY B3 KEY 86
0334  41             DB       65    ;XY B4 KEY 79
0335  2A             DB       42    ;XY B5 KEY 82 SHIFT
0336  42             DB       66    ;XY B6 KEY 80
0337  2B             DB       43    ;XY B7 KEY 81
0338  21             DB       33    ;XY B8 KEY 66
0339  20             DB       32    ;XY B9 KEY 65
033A  1F             DB       31    ;XY BA KEY 64
033B  22             DB       34    ;XY BB KEY 67
033C  3F             DB       63    ;XY BC KEY 60
033D  1E             DB       30    ;XY BD KEY 63
```

ASMB-48 DEVELOPMENT SYSTEM

```
033E  40              DB      64     ;XY BE KEY 61
033F  1D              DB      29     ;XY BF KEY 62 CNTL
0340  13     T40A     DB      19     ;XY C0 KEY 46
0341  12              DB      18     ;XY C1 KEY 45
0342  11              DB      17     ;XY C2 KEY 44
0343  14              DB      20     ;XY C3 KEY 47
0344  3D              DB      61     ;XY C4 KEY 40
0345  10              DB      16     ;XY C5 KEY 43
0346  3E              DB      62     ;XY C6 KEY 41
0347  0F              DB      15     ;XY C7 KEY 42
0348  05              DB      5      ;XY C8 KEY 28
0349  04              DB      4      ;XY C9 KEY 27
034A  03              DB      3      ;XY CA KEY 26
034B  06              DB      6      ;XY CB KEY 29
034C  3B              DB      59     ;XY CC KEY 22
034D  02              DB      2      ;XY CD KEY 25
034E  3C              DB      60     ;XY CE KEY 23
034F  01              DB      1      ;XY CF KEY 24
0350  5A     T50A     DB      90     ;XY D0 KEY 7
0351  59              DB      89     ;XY D1 KEY 6
0352  58              DB      88     ;XY D2 KEY 5
0353  5B              DB      91     ;XY D3 KEY 8
0354  54              DB      84     ;XY D4 KEY 1
0355  57              DB      87     ;XY D5 KEY 4
0356  55              DB      85     ;XY D6 KEY 2
0357  56              DB      86     ;XY D7 KEY 3
0358  5C              DB      92     ;XY D8 KEY 9
0359  5D              DB      93     ;XY D9 KEY 10
035A  5E              DB      94     ;XY DA KEY 11
035B  60              DB      96     ;XY DB KEY 13
035C  00              DB      0      ;XY DC KEY
035D  5F              DB      95     ;XY DD KEY 12
035E  00              DB      0      ;XY DE KEY
035F  00              DB      0      ;XY DF KEY
0360  16     T60A     DB      22     ;XY E0 KEY 49
0361  18              DB      24     ;XY E1 KEY 51
0362  17              DB      23     ;XY E2 KEY 50
0363  19              DB      25     ;XY E3 KEY 52
0364  23              DB      35     ;XY E4 KEY 68
0365  15              DB      21     ;XY E5 KEY 48
0366  24              DB      36     ;XY E6 KEY 69
0367  25              DB      37     ;XY E7 KEY 70
0368  3A              DB      58     ;XY E8 KEY 103 CAPS
0369  52              DB      82     ;XY E9 KEY 104
036A  53              DB      83     ;XY EA KEY 105
036B  39              DB      57     ;XY EB KEY 102
036C  1C              DB      28     ;XY EC KEY 106
036D  38              DB      56     ;XY ED KEY 101 ALT
036E  43              DB      67     ;XY EE KEY 99
036F  44              DB      68     ;XY EF KEY 100
0370  00     T70A     DB      0      ;XY F0 KEY
0371  00              DB      0      ;XY F1 KEY
0372  26              DB      38     ;XY F2 KEY 71
0373  30              DB      48     ;XY F3 KEY 87
0374  31              DB      49     ;XY F4 KEY 88
0375  00              DB      0      ;XY F5 KEY
0376  32              DB      50     ;XY F6 KEY 89
0377  33              DB      51     ;XY F7 KEY 90
0378  00              DB      000H   ;FOR CHECKSUM = 0
0379  D5     BUFFR1   SEL     RB1
037A  767F            JF1     M426   ;BUFFER EMPTY?
037C  B820            MOV     R0,#20H ;INITIALIZE BUFFER
037E  B5              CPL     F1     ;BUFFER INITIALIZED
037F  A9     M426     MOV     R1,A   ;SAVE CHARACTER IN R1
0380  F8              MOV     A,R0   ;
0381  D330            XRL     A,#30H ;BUFFER FULL?
0383  C68D            JZ      M434   ;
0385  07              DEC     A      ;BUFFER ONE CHAR FROM FULL?
0386  968A            JNZ     M431
```

ASMB-48 DEVELOPMENT SYSTEM

```
0388  B9FF              MOV     R1,#0FFH ;REPORT BUFFER OVERFLOW
038A  F9       M431     MOV     A,R1     ;PUT CHARACTER IN BUFFER
038B  A0                MOV     @R0,A
038C  18                INC     R0
038D  93       M434     RETR
038E                    END
0000  ERRORS
```

| | | | | | | | |
|---|---|---|---|---|---|---|---|
| BUFFER | 0203 | BUFFR1 | 0379 | CAPSL | 009F | COD | 0074 |
| COD2 | 0078 | COR | 0061 | FALSE | 004B | HIST0 | 0048 |
| HIST1 | 0059 | INCR0 | 0017 | M00 | 0000 | MOD | 000F |
| M10 | 0012 | M100 | 0100 | M109 | 0109 | M114 | 0114 |
| M128 | 012B | M200 | 0200 | M203 | 0289 | M20D | 0292 |
| M20E | 0293 | M226 | 0209 | M231 | 0214 | M232 | 0227 |
| M233 | 0234 | M234 | 0237 | M235 | 0238 | M23D | 023E |
| M24D | 024E | M253 | 0254 | M255 | 0256 | M25C | 025D |
| M25F | 0260 | M26 | 001D | M263 | 0264 | M26D | 0270 |
| M273 | 0278 | M286 | 029B | M287 | 029C | M289 | 02A0 |
| M293 | 02AA | M297 | 02AE | M29B | 02B2 | M2A5 | 02BC |
| M2AA | 02C1 | M2AE | 02C5 | M2B1 | 02C8 | M2B5 | 02CC |
| M426 | 037F | M431 | 038A | M434 | 038D | MASK | 0055 |
| ME4 | 00AF | ME5 | 00B0 | NOREP | 003A | NOTCAP | 00A6 |
| NUML | 008B | OUTP2 | 00A4 | RELEAS | 0065 | REP | 0033 |
| SCAN | 004E | SEND | 00AB | SETUP | 002E | SHIFTL | 0297 |
| START | 0015 | T00A | 0300 | T10A | 0310 | T20A | 0320 |
| T30A | 0330 | T40A | 0340 | T50A | 0350 | T60A | 0360 |
| T70A | 0370 | TIMER | 021C | TSTCAP | 009B | | |

ASMB-48 DEVELOPMENT SYSTEM

APPENDIX B

```
KEYBOARD_VECTORS        SEGMENT AT 0H    ; LOCATIONS OF KEYBOARD INT. VECTORS
                        ORG      9H*4    ; ADDRESS IN LOW MEMORY
VECTOR_9                LABEL    DWORD   ; KEYSTROKE OCCURRED INTERRUPT
                        ORG      16H*4   ; ADDRESS IN LOW MEMORY
VECTOR_16               LABEL    DWORD   ; KEYBOARD I/O INTERRUPT
KEYBOARD_VECTORS        ENDS

;----------------------------------------
;             EQUATES                   :
;----------------------------------------

EOI                     EQU      20H
KB_DATA                 EQU      60H     ; KEYBOARD SCAN CODE PORT
KB_CTL                  EQU      61H     ; CONTROL BITS FOR KB SENSE DATA

;----------------------------------------
;         ROM BIOS DATA AREAS           :
;----------------------------------------

DATA                    SEGMENT AT 40H

;----------------------------------------
;         KEYBOARD DATA AREAS           :
;----------------------------------------

ORG      017H    ;zzzzzz ; TO MATCH IBM-BIOS
KB_FLAG                 DB       ?
```

```
;----- SHIFT FLAG EQUATES WITHIN KB_FLAG

INS_STATE       EQU     80H             ; INSERT STATE IS ACTIVE
CAPS_STATE      EQU     40H             ; CAPS LOCK STATE HAS BEEN TOGGLED
NUM_STATE       EQU     20H             ; NUM LOCK STATE HAS BEEN TOGGLED
SCROLL_STATE    EQU     10H             ; SCROLL LOCK STATE HAS BEEN TOGGLED
ALT_SHIFT       EQU     08H             ; ALTERNATE SHIFT KEY DEPRESSED
CTL_SHIFT       EQU     04H             ; CONTROL SHIFT KEY DEPRESSED
LEFT_SHIFT      EQU     02H             ; LEFT SHIFT KEY DEPRESSED
RIGHT_SHIFT     EQU     01H             ; RIGHT SHIFT KEY DEPRESSED

KB_FLAG_1       DB      ?               ; SECOND BYTE OF KEYBOARD STATUS
INS_SHIFT       EQ      80H             ; INSERT KEY IS DEPRESSED
CAPS_SHIFT      EQU     40H             ; CAPS LOCK  Y IS DEPRESSED
NUM_SHIFT       EQU     20H             ; NUM LOCK KEY IS DEPRESSED
SCROLL_SHIFT    EQU     10H             ; SCROLL LOCK KEY IS DEPRESSED
HOLD_STATE      EQU     08H             ; SUSPEND KEY HAS BEEN TOGGLED

ALT_INPUT       DB      ?               ; STORAGE FOR ALTERNATE KEYPAD ENTRY
BUFFER_HEAD     DW      ?               ; POINTER TO HEAD OF KEYBOARD BUFFER
BUFFER_TAIL     DW      ?               ; POINTER TO TAIL OF KEYBOARD BUFFER
; KB_BUFFER     DW      16 DUP(?)       ; ROOM FOR 15 ENTRIES
; KB_BUFFER_END LABEL   WORD

;----- HEAD = TAIL INDICATES THAT THE BUFFER IS EMPTY

NUM_KEY         EQU     69              ; SCAN CODE FOR NUMBER LOCK
SCROLL_KEY      EQU     70              ; SCROLL LOCK KEY
ALT_KEY         EQU     56              ; ALTERNATE SHIFT KEY SCAN CODE
CTL_KEY         EQU     29              ; SCAN CODE FOR CONTROL KEY
CAPS_KEY        EQU     58              ; SCAN CODE FOR SHIFT LOCK
LEFT_KEY        EQU     42              ; SCAN CODE FOR LEFT SHIFT
RIGHT_KEY       EQU     54              ; SCAN CODE FOR RIGHT SHIFT
INS_KEY         EQU     82              ; SCAN CODE FOR INSERT KEY
DEL_KEY         EQU     83              ; SCAN CODE FOR DELETE KEY

;----------------------------------------
;         VIDEO DISPLAY DATA AREA        :
;----------------------------------------
                ORG     049H    ;zzzzzz ; TO MATCH IBM-BIOS
CRT_MODE        DB      ?               ; CURRENT CRT MODE
                ORG     065H    ;zzzzzz ; TO MATCH IBM-BIOS
CRT_MODE_SET    DB      ?               ; CURRENT SETTING OF THE 3X8 REGISTER ;----------------------------------------
;              SYSTEM DATA AREA          :
;----------------------------------------
```

```
                        ORG     071H        ;zzzzzz ; TO MATCH IBM-BIOS
BIOS_BREAK      DB      ?                   ; BIT 7 = 1 IF BREAK KEY WAS DEPRESSED
RESET_FLAG      DW      ?                   ; WORD = 1234H IF KB RESET UNDERWAY ;-------------------------------------------------------------
;       EXTRA KEYBOARD DATA AREAS           :
;-------------------------------------------------------------
                ORG     080H        ;zzzzzz ; TO MATCH IBM-BIOS
BUFFER_END      DW      .
KB_BUFFER       DW      32 DUP(?) ;12/2 ; ROOM FOR ?  ENTRIES
KB_BUFFER_END   LABEL   WORD        ;12/2
BYTE1           DB      ?           ;xx12/2 ; FIRST KEYBOARD SCANCODE BYTE
BYTE2           DB      ?           ;xx12/2 ; SECOND KEYBOARD SCANCODE BYTE
BYTE3           DB      ?           ;xx12/2 ; THIRD KEYBOARD SCANCODE BYTE
;xx TEMPWORD    DW      ?           ;xx12/3 ; TEMPORARY STORAGE OF SCANCODE IN AX
NUMBYTE         DB      0           ;x12/11 ; NUMBER OF INPUT BYTE
DATA            ENDS ;-------------------------------------------------------------
;       8088 PROCESSOR TEST                             :
; DESCRIPTION                                           :
;       VERIFY 8088 FLAGS, REGISTERS AND CONDITIONAL JUMPS    :
;-------------------------------------------------------------
RESET_ROUTINE   SEGMENT AT 0F000H  ;zzzz ; DEFINED AT CORRECT SEG:OFFSET IN BIOS
        ORG     0E05BH
RESET   LABEL   FAR
RESET_ROUTINE   ENDS               ;zzzz ; DEFINED AT CORRECT SEG:OFFSET IN BIOS CODE            SEGMENT            ;zzzzzz ; 'AT 3000H' OMITTED (PG. 5-39 MAC-ASM)
;---- INT 16 -------------------------------------------------
; KEYBOARD I/O                                          :
;       THESE ROUTINES PROVIDE KEYBOARD SUPPORT         :
; INPUT                                                 :
;       (AH)=0  READ THE NEXT ASCII CHARACTER STRUCK FROM THE KEYBOARD :
;               RETURN THE RESULT IN (AL), SCAN CODE IN (AH) :
;       (AH)=1  SET THE Z FLAG TO INDICATE IF AN ASCII CHARACTER IS :
;               AVAILABLE TO BE READ.                   :
;               (ZF)=1 -- NO CODE AVAILABLE             :
;               (ZF)=0 -- CODE IS AVAILABLE             :
;               IF ZF = 0, THE NEXT CHARACTER IN THE BUFFER TO BE READ :
;               IS IN AX, AND THE ENTRY REMAINS IN THE BUFFER :
;       (AH)=2  RETURN THE CURRENT SHIFT STATUS IN AL REGISTER :
;               THE BIT SETTINGS FOR THIS CODE ARE INDICATED IN THE :
;               THE EQUATES FOR KB_FLAG                 :
; OUTPUT                                                :
;       AS NOTED ABOVE, ONLY AX AND FLAGS CHANGED       :
;       ALL REGISTERS PRESERVED                         :
```

```
             ASSUME   CS:CODE,DS:DATA
;xxxxxx      ORG      0E82EH         ;xx12/1 ; MOVE CODE BACK BY 16 BYTES TO AVOID
             ORG      0E81EH         ;xx12/1 ;   OVERLAPPING INTO INT_9 CODE (E987)
             PUSH     DS                     ; SAVE CURRE    DS
             PUSH     BX                     ; SAVE BX TEMPORARILY
             CALL     DDS
             OR       AH,AH                  ; AH=0
             JZ       K1                     ; ASCII_READ
             DEC      AH                     ; AH=1
             JZ       K2                     ; ASCII_STATUS
             DEC      AH                     ; AH=2
             JZ       K3                     ; SHIFT_STATUS
             JMP      SHORT INT10_END        ; EXIT

;----- READ THE KEY TO FIGURE OUT WHAT TO DO

K1:                                      ; ASCII READ
             STI                             ; INTERRUPTS BACK ON DURING LOOP
             NOP                             ; ALLOW AN INTERRUPT TO OCCUR
             CLI                             ; INTERRUPTS BACK OFF
             MOV      BX,BUFFER_HEAD         ; GET POINTER TO HEAD OF BUFFER
             CMP      BX,BUFFER_TAIL         ; TEST END OF BUFFER
             JZ       K1                     ; LOOP UNTIL SOMETHING IN BUFFER
             MOV      AX,[BX]                ; GET SCAN CODE AND ASCII CODE
             MOV      CX,[BX+2]      ;xx12/1 ; RECOVER 2ND TWO BYTES FROM KEY BUFFER
             CALL     K4                     ; MOVE POINTER TO NEXT POSITION
             MOV      BUFFER_HEAD,BX         ; STORE VALUE IN VARIABLE
             JMP      SHORT INT10_END        ; RETURN

;----- ASCII STATUS

K2:
             CLI                             ; INTERRUPTS OFF
             MOV      BX,BUFFER_HEAD         ; GET HEAD POINTER
             CMP      BX,BUFFER_TAIL         ; IF EQUAL (Z=1) THEN NOTHING THERE
             MOV      AX,[BX]
             MOV      CX,[BX+2]      ;xx12/1 ; RECOVER 2ND TWO BYTES FROM KEY BUFFER
             STI                             ; INTERRUPTS BACK ON
             POP      BX                     ; RECOVER REGISTER
             POP      DS                     ; RECOVER SEGMENT
             RET      2                      ; THROW AWAY FLAGS

;----- SHIFT STATUS
```

```
K3:
        POP     BX                      ; RECOVER R. ISTER
        POP     DS                      ; RECOVER REGISTERS
        IRET                            ; RETURN TO CALLER
KEYBOARD_IO     ENDP

;----- INCREMENT A BUFFER POINTER

K4      PROC    NEAR
        INC     BX                      ; MOVE TO NEXT WORD IN LIST
        INC     BX
        INC     BX              ;xx12/1 ; TO ACCOMODATE THE NEW 4-BYTE
        INC     BX              ;xx12/1 ;  KB_BUFFER (UP FROM 2 BYTES)
        CMP     BX,BUFFER_END           ; AT END OF BUFFER?
        JNE     K5                      ; NO, CONTINUE
        MOV     BX,BUFFER_START         ; YES, RESET TO BUFFER BEGINNING
K5:
        RET
K4      ENDP

;----- TABLE OF SHIFT KEYS AND MASK VALUES

K6      LABEL   BYTE
        DB      INS_KEY                                 ; INSERT KEY
        DB      CAPS_KEY,NUM_KEY,SCROLL_KEY,ALT_KEY,CTL_KEY
        DB      LEFT_KEY,RIGHT_KEY
K6L     EQU     $-K6

;----- SHIFT MASK TABLE

K7      LABEL   BYTE
        DB      INS_SHIFT                               ; INSERT MODE SHIFT
        DB      CAPS_SHIFT,NUM_SHIFT,SCROLL_SHIFT,ALT_SHIFT,CTL_SHIFT
        DB      LEFT_SHIFT,RIGHT_SHIFT

;----- SCAN CODE TABLES

K8              DB      27,-1,0,-1,-1,-1,30,-1
                DB      -1,-1,-1,31,-1,127,-1,17
                DB      23,5,18,20,25,21,9,15
                DB      16,27,29,10,-1,1,19
                DB      4,6,7,8,10,11,12,-1,-1
                DB      -1,-1,28,26,24,3,22,2
CTL_TABLE_SCAN
        LABEL   BYTE
                DB      94,95,96,97,98,99,100,101
                DB      102,103,-1,-1,119,-1,132,-1
```

```
            DB      115,-1,116,-1,117,-1,118,-1
            DB      -1
--- LC TABLE
    LABEL   BYTE
            DB      01BH,'1234567890-=',08H,09H
            DB      'qwertyuiop[]',0DH,-1,'asdfghjkl;',027H
            DB      60H,-1,5CH,'zxcvbnm,./',-1,'*',-1,' ',-1
            DB      -1
--- UC TABLE
    LABEL   BYTE
            DB      27,'!@#$',37,05EH,'&*()_+',08H,0
            DB      'QWERTYUIOP§†',0DH,-1,'ASDFGHJKL:"'
            DB      07EH,-1,'¶ZXCVBNM<>?',-1,0,-1,' ',-1
---- UC TABLE SCAN
    LABEL   BYTE
            DB      84,85,86,87,88,89,90
            DB      91,92,93
--- ALT TABLE SCAN
    LABEL   BYTE
            DB      104,105,106,107,108
            DB      109,110,111,112,113
---- NUM STATE TABLE
    LABEL   BYTE
            DB      '789-456+1230.'
---- BASE CASE TABLE
    LABEL   BYTE
            DB      71,72,73,-1,75,-1,77
            DB      -1,79,80,81,82,83
            DB      4 DUP(0FFH)      ;zzzzzz ; TO MATCH ROM-BIOS
    K_COUNT DW      0                ;wwwwww ; COUNT OF KEY HITS
;----- KEYBOARD INTERRUPT ROUTINE ORG     0E987H
    KB_INT  PROC    FAR
            STI                      ; ALLOW FURTHER INTERRUPTS
            PUSH    AX
            PUSH    BX
            PUSH    CX
            PUSH    DX
            PUSH    SI
            PUSH    DI
            PUSH    DS
            PUSH    ES
    ;xx     MOV     CL,0             ;xx12/2 ; CL CONTAINS ORDINAL OF INPUT BYTE
            CLD                      ; FORWARD DIRECTION:
            CALL    DDS
```

```
;xx J0:
        IN      AL,KB_DATA              ; READ IN THE CHARACTER
        PUSH    AX                      ; SAVE IT
        IN      AL,KB_CTL               ; GET THE CONTROL PORT
        MOV     AH,AL                   ; SAVE VALUE
        OR      AL,80H                  ; RESET BIT FOR KEYBOARD
        OUT     KB_CTL,AL
        XCHG    AH,AL                   ; GET BACK ORIGINAL CONTROL
        OUT     KB_CTL,AL               ; KB HAS BEEN RESET
        POP     AX                      ; RECOVER SCAN CODE
        MOV     AH,AL                   ; SAVE SCAN CODE IN AH ALSO

J1:                                     ;xx12/2 ; TEST FOR FIRST INPUT BYTE
        MOV     CL,NUMBYTE              ;x12/11 ; GET BYTE COUNT
        OR      CL,CL                   ;xx12/2 ; IS THIS FIRST INPUT BYTE?
        JNZ     J2                      ;xx12/2 ; JUMP IF NOT
;xx     MOV     TEMPWORD,AX             ;xx12/3 ; SAVE FIRST SCANCODE TEMPORARILY
        MOV     BYTE1,AH                ;xx12/2 ; SAVE FIRST INPUT BYTE
;xx     MOV     CL,1                    ;xx12/2 ; SET UP FOR SECOND INPUT BYTE
        MOV     NUMBYTE,1               ;x12/11 ; SET UP FOR SECOND INPUT BYTE
        JMP     K26                     ;x12/11 ; INTERRUPT RETURN
J2:                                     ;xx12/2 ; TEST FOR SECOND INPUT BYTE
        MOV     CL,NUMBYTE              ;x12/11 ; GET BYTE COUNT
        DEC     CL                      ;xx12/2 ; IS THIS SECOND INPUT BYTE?
        JNZ     J3                      ;xx12/2 ; JUMP IF NOT
        MOV     BYTE2,AH                ;xx12/2 ; SAVE SECOND INPUT BYTE
;xx     MOV     CL,2                    ;xx12/2 ; SET UP FOR THIRD INPUT BYTE
        MOV     NUMBYTE,2               ;x12/11 ; SET UP FOR THIRD INPUT BYTE
;xx     JMP     SHORT J0                ;xx12/2 ; GO BACK FOR THIRD INPUT BYTE
        JMP     K26                     ;x12/11 ; INTERRUPT RETURN
J3:                                     ;xx12/2 ; PROCESS THIRD INPUT BYTE
        MOV     BYTE3,AH                ;xx12/2 ; SAVE THIRD INPUT BYTE

;xx     MOV     AX,TEMPWORD             ;xx12/3 ; RESTORE ORIGINAL SCANCODE INTO AX
        MOV     NUMBYTE,0               ;x12/11 ; RESET COUNT FOR NEXT BYTE TRIO
        MOV     AL,BYTE1                ;x12/11 ; RESTORE ORIGINAL SCANCODE INTO AX
        MOV     AH,BYTE1                ;x12/11 ;
        JMP     K61                     ;x12/11 ; PUT IT INTO THE BUFFER

NOP                             ;wwwww
        NOP                             ;wwwww
        NOP                             ;wwwww

;------ TEST FOR OVERRUN SCAN CODE FROM KEYBOARD

CMP     AL,0FFH                 ; IS THIS AN OVERRUN CHAR
```

```
        JNZ     K16                     ; NO, TEST FOR SHIFT KEY
        JMP     K62                     ; BUFFER_FULL_BEEP

;----- TEST FOR SHIFT KEYS

K16:                                    ; TEST_SHIFT
        AND     AL,07FH                 ; TURN OFF THE BREAK BIT
        PUSH    CS
        POP     ES                      ; ESTABLISH ADDRESS OF SHIFT TABLE
        MOV     DI,OFFSET K6            ; SHIFT KEY TABLE
        MOV     CX,K6L                  ; LENGTH
        REPNE   SCASB                   ; LOOK THROUGH THE TABLE FOR A MATCH
        MOV     AL,AH                   ; RECOVER SCAN CODE
        JE      K17                     ; JUMP IF MATCH FOUND
        JMP     K25                     ; IF NO MATCH, THEN SHIFT NOT FOUND

;----- SHIFT KEY FOUND
K17:    SUB     DI,OFFSET K6+1          ; ADJUST PTR TO SCAN CODE MTCH
        MOV     AH,CS:K7[DI]            ; GET MASK INTO AH
        TEST    AL,80H                  ; TEST FOR BREAK KEY
        JNZ     K23                     ; BREAK_SHIFT_FOUND

;----- SHIFT MAKE FOUND, DETERMINE SET OR TOGGLE

CMP     AH,SCROLL_SHIFT
        JAE     K18                     ; IF SCROLL SHIFT OR ABOVE, TOGGLE KEY

;----- PLAIN SHIFT KEY, SET SHIFT ON

OR      KB_FLAG,AH              ; TURN ON SHIFT BIT
        JMP     K26                     ; INTERRUPT_RETURN

;----- TOGGLED SHIFT KEY, TEST FOR 1ST MAKE OR NOT

K18:                                    ; SHIFT-TOGGLE
        TEST    KB_FLAG, CTL_SHIFT      ; CHECK CTL SHIFT STATE
        JNZ     K25                     ; JUMP IF CTL STATE
        CMP     AL, INS_KEY             ; CHECK FOR INSERT KEY
        JNZ     K22                     ; JUMP IF NOT INSERT KEY
        TEST    KB_FLAG, ALT_SHIFT      ; CHECK FOR ALTERNATE SHIFT
        JNZ     K25                     ; JUMP IF ALTERNATE SHIFT
K19:    TEST    KB_FLAG, NUM_STATE      ; CHECK FOR BASE STATE
        JNZ     K21                     ; JUMP IF NUM LOCK IS ON
        TEST    KB_FLAG, LEFT_SHIFT+ RIGHT_SHIFT
        JZ      K22                     ; JUMP IF BASE STATE
```

```
K20:                                    ; NUMERIC ZERO, NOT INSERT KEY
        MOV     AX, 5230H               ; PUT OUT AN ASCII ZERO
        JMP     K57                     ; BUFFER_FILL
K21:                                    ; MIGHT BE NUMERIC
        TEST    KB_FLAG, LEFT_SHIFT+ RIGHT_SHIFT
        JZ      K20                     ; JUMP NUMERIC, NOT INSERT

K22:                                    ; SHIFT TOGGLE KEY HIT; PROCESS IT
        TEST    AH,KB_FLAG_1            ; IS KEY ALREADY DEPRESSED
        JNZ     K26                     ; JUMP IF KEY ALREADY DEPRESSED
        OR      KB_FLAG_1,AH            ; INDICATE THAT THE KEY IS DEPRESSED
        XOR     KB_FLAG,AH              ; TOGGLE THE SHIFT STATE
        CMP     AL,INS_KEY              ; TEST FOR 1ST MAKE OF INSERT KEY
        JNE     K26                     ; JUMP IF NOT INSERT KEY
        JAE     K24                     ; YES, HANDLE BREAK TOGGLE
        NOT     AH                      ; INVERT MAS.
        AND     KB_FLAG,AH              ; TURN OFF SHIFT BIT
        CMP     AL,ALT_KEY+80H          ; IS THIS ALTERNATE SHIFT RELEASE
        JNE     K26                     ; INTERRUPT_RETURN

;----- ALTERNATE SHIFT KEY RELEASED, GET THE VALUE INTO BUFFER

MOV     AL,ALT_INPUT
        MOV     AH,0                    ; SCAN CODE OF 0
        MOV     ALT_INPUT,AH            ; ZERO OUT THE FIELD
        CMP     AL,0                    ; WAS THE INPUT=0
        JE      K26                     ; INTERRUPT_RETURN
        JMP     K58                     ; IT WASN'T, SO PUT IN BUFFER
K24:                                    ; BREAK-TOGGLE
        NOT     AH                      ; INVERT MASK
        AND     KB_FLAG_1,AH            ; INDICATE NO LONGER DEPRESSED
        JMP     SHORT K26               ; INTERRUPT_RETURN

;----- TEST FOR HOLD STATE

K25:                                    ; NO-SHIFT-FOUND
        CMP     AL,80H                  ; TEST FOR BREAK KEY
        JAE     K26                     ; NOTHING FOR BREAK CHARS FROM HERE ON
        TEST    KB_FLAG_1,HOLD_STATE    ; ARE WE IN HOLD STATE
        JZ      K28                     ; BRANCH AROUND TEST IF NOT
        CMP     AL,NUM_KEY
        JE      K26                     ; CAN'T END HOLD ON NUM_LOCK
        AND     KB_FLAG_1,NOT HOLD_STATE    ; TURN OFF THE HOLD STATE BIT
K26:                                    ; INTERRUPT-RETURN
        CLI                             ; TURN OFF INTERRUPTS
        MOV     AL,EOI                  ; END OF INTERRUPT COMMAND
        OUT     020H,AL                 ; SEND COMMAND TO INT CONTROL PORT
```

```
K27:                                    ; INTERRUPT-RETURN-NO-EOI
        POP     ES
        POP     DS
        POP     DI
        POP     SI
        POP     CX
        POP     BX
        POP     AX              ; RESTORE STATE
        IRET                    ; RETURN, INTERRUPTS BACK ON
                                ; WITH FLAG CHANGE

;----- NOT IN HOLD STATE, TEST FOR SPECIAL CHARS

K28:                            ; NO-HOLD-STATE
        TEST    KB_FLAG,ALT_SHIFT   ; ARE WE IN ALTERNATE SHIFT
        JNZ     K29             ; JUMP IF ALTERNATE SHIFT
        JMP     K38             ; JUMP IF NOT ALTERNATE

;----- TEST FOR RESET KEY SEQUENCE (CTL ALT DEL)

K29:                            ; TEST-RESET
        TEST    KB_FLAG,CTL_SHIFT   ; ARE WE IN CONTROL SHIFT ALSO
        JZ      K31             ; NO_RESET
        CMP     AL,DEL_KEY      ; SHIFT STATE IS THERE, TEST KEY
        JNE     K31             ; NO_RESET

;----- CTL-ALT-DEL HAS BEEN FOUND, DO I/O CLEANUP

MOV     RESET_FLAG, 1234H   ; SET FLAG FOR RESET FUNCTION
        JMP     RESET           ; JUMP TO POWER ON DIAGNOSTICS

;----- ALT-INPUT-TABLE
K30     LABEL   BYTE
        DB      82,79,80,81,75,76,77
        DB      71,72,73        ; 10 NUMBERS ON KEYPAD
;----- SUPER-SHIFT-TABLE
        DB      16,17,18,19,20,21,22,23  ; A-Z TYPEWRITER CHARS
        DB      24,25,30,31,32,33,34,35
        DB      36,37,38,44,45,46,47,48
        DB      49,50

;----- IN ALTERNATE SHIFT, RESET NOT FOUND

K31:                            ; NO-RESET
        CMP     AL,57           ; TEST FOR SPACE KEY
        JNE     K32             ; NOT THERE
```

```
            MOV     AL,' '                  ; SET SPACE CHAR
;----- LOOK FOR KEY PAD ENTRY

K32:                                    ; ALT-KEY-PAD
            MOV     DI,OFFSET K30           ; ALT-INPUT-TABLE
            MOV     CX,10                   ; LOOK FOR ENTRY USING KEYPAD
            REPNE   SCASB                   ; LOOK FOR MATCH
            JNE     K33                     ; NO_ALT_KEYPAD
            SUB     DI,OFFSET K30+1         ; DI NOW HAS ENTRY VALUE
            MOV     AL,ALT_INPUT            ; GET THE CURRENT BYTE
            MOV     AH,10                   ; MULTIPLY BY 10
            MUL     AH
            ADD     AX,DI                   ; ADD IN THE LATEST ENTRY
            MOV     ALT_INPUT,AL            ; STORE IT AWAY
            JMP     K26                     ; THROW AWAY THAT KEYSTROKE

;----- LOOK FOR SUPERSHIFT ENTRY

K33:                                    ; NO-ALT-KEYPAD
            MOV     ALT_INPUT,0             ; ZERO ANY PREVIOUS ENTRY INTO INPUT
            MOV     CX,26                   ; DI,ES ALREADY POINTING
            REPNE   SCASB                   ; LOOK FOR MATCH IN ALPHABET
            JNE     K34                     ; NOT FOUND, FUNCTION KEY OR OTHER
            MOV     AL,0                    ; ASCII CODE OF ZERO
            JMP     K57                     ; PUT IT IN THE BUFFER

;----- LOOK FOR TOP ROW OF ALTERNATE SHIFT

K34:                                    ; ALT-TOP-ROW
            CMP     AL,2                    ; KEY WITH '1' ON IT
            JB      K35                     ; NOT ONE OF INTERESTING KEYS
            CMP     AL,14                   ; IS IT IN THE REGION
            JAE     K35                     ; ALT-FUNCTION
            ADD     AH,118                  ; CONVERT PSUEDO SCAN CODE TO RANGE
            MOV     AL,0                    ; INDICATE AS SUCH
            JMP     K57                     ; BUFFER_FILL

;----- TRANSLATE ALTERNATE SHIFT PSEUDO SCAN CODES

K35:                                    ; ALT-FUNCTION
            CMP     AL,59                   ; TEST FOR IN TABLE
            JAE     K37                     ; ALT-CONTINUE
    K36:                                    ; CLOSE-RETURN

K37:                                    ; ALT-CONTINUE
            CMP     AL,71                   ; IN KEYPAD REGION
            JAE     K36                     ; IF SO, IGNORE
```

```
                MOV     BX,OFFSET K13           ; ALT SHIFT PSEUDO SCAN TABLE
                JMP     K63                     ; TRANSLATE THAT

;----- NOT IN ALTERNATE SHIFT

K38:                                            ; NOT-ALT-SHIFT
                TEST    KB_FLAG,CTL_SHIFT       ; ARE WE IN CONTROL SHIFT
                JZ      K44                     ; NOT-CTL-SHIFT

;----- CONTROL SHIFT, TEST SPECIAL CHARACTERS
;----- TEST FOR BREAK AND PAUSE KEYS

CMP     AL,SCROLL_KEY           ; TEST FOR BREAK
                JNE     K39                     ; NO-BREAK
                MOV     BX,BUFFER_START         ; RESET BUFFER TO EMPTY
                MOV     BUFFER_HEAD,BX
                MOV     BUFFER_TAIL,BX
                MOV     BIOS_BREAK,80H          ; TURN ON BIOS_BREAK BIT
                INT     1BH                     ; BREAK INTERRUPT VECTOR
                SUB     AX,AX                   ; PUT OUT DUMMY CHARACTER
                JMP     K57                     ; BUFFER_FILL
K39:                                            ; NO-BREAK
                CMP     AL,NUM_KEY              ; LOOK FOR PAUSE KEY
                JNE     K41                     ; NO-PAUSE
                OR      KB_FLAG_1,HOLD_STATE    ; TURN ON THE HOLD FLAG
                MOV     AL,EOI                  ; END OF INTERRUPT TO CONTROL PORT
                OUT     020H,AL                 ; ALLOW FURTHER KEYSTROKE INTS

;----- DURING PAUSE INTERVAL, TURN CRT BACK ON

CMP     CRT_MODE,7              ; IS THIS BLACK AND WHITE CARD
                JE      K40                     ; YES, NOTHING TO DO
                MOV     DX,03D8H                ; PORT FOR COLOR CARD
                MOV     AL,CRT_MODE_SET         ; GET THE VALUE OF THE CURRENT MODE
                OUT     DX,AL                   ; SET THE CRT MODE, SO THAT CRT IS ON
K40:                                            ; PAUSE-LOOP
                TEST    KB_FLAG_1,HOLD_STATE
                JNZ     K40                     ; LOOP UNTIL FLAG TURNED OFF
                JMP     K27                     ; INTERRUPT_RETURN_NO_EOI
K41:                                            ; NO-PAUSE
;----- TEST SPECIAL CASE KEY 55

CMP     AL,55
                JNE     K42                     ; NOT-KEY-55
                MOV     AX,114*256              ; START/STOP PRINTING SWITCH
                JMP     K57                     ; BUFFER_FILL
```

```
;----- SET UP TO TRANSLATE CONTROL SHIFT

K42:                                        ; NOT-KEY-55
        MOV     BX,OFFSET K8                ; SET UP TO TRANSLATE CTL
        CMP     AL,59                       ; IS IT IN TABLE
                                            ; CTL-TABLE-TRANSLATE
        JB      K56                         ; YES, GO TRANSLATE CHAR
K43:                                        ; CTL-TABLE-TRANSLATE
        MOV     BX,OFFSET K9                ; CTL TABLE SCAN
        JMP     K63                         ; TRANSLATE_SCAN

;----- NOT IN CONTROL SHIFT

K44:                                        ; NOT-CTL-SHIFT
        CMP     AL,71                       ; TEST FOR KEYPAD REGION
        JAE     K48                         ; HANDLE KEYPAD REGION
        TEST    KB_FLAG,LEFT_SHIFT+RIGHT_SHIFT
        JZ      K54                         ; TEST FOR SHIFT STATE

;----- UPPER CASE, HANDLE SPECIAL CASES

CMP     AL,15                       ; BACK TAB KEY
        JNE     K45                         ; NOT-BACK-TAB
        MOV     AX,15*256                   ; SET PSEUDO SCAN CODE
        JMP     SHORT K57                   ; BUFFER_FILL
K45:                                        ; NOT-BACK-TAB
        CMP     AL,55                       ; PRINT SCREEN KEY
        JNE     K46                         ; NOT-PRINT-SCREEN

;----- ISSUE INTERRUPT TO INDICATE PRINT SCREEN FUNCTION

MOV     AL,EOI                      ; END OF CURRENT INTERRUPT
        OUT     020H,AL                     ;  SO FURTHER THINGS CAN HAPPEN
        INT     5H                          ; ISSUE PRINT SCREEN INTERRUPT
        JMP     K27                         ; GO BACK WITHOUT EOI OCCURRING
K46:                                        ; NOT-PRINT-SCREEN
        JB      K47                         ; NOT-UPPR-FUNCTION
        MOV     BX,OFFSET K12               ; UPPER CASE PSEUDO SCAN CODES
        JMP     K63                         ; TRANSLATE SCAN
K47:                                        ; NOT-UPPER-FUNCTION
        MOV     BX,OFFSET K11               ; POINT TO UPPER CASE TABLE
        JMP     SHORT K56                   ; OK, TRANSLATE THE CHAR

;----- KEYPAD KEYS, MUST TEST NUM LOCK FOR DETERMINATION
```

```
K48:                                    ; KEYPAD-REGION
        TEST    KB_FLAG,NUM_STATE       ; ARE WE IN NUM_LOCK
        JNZ     K52                     ; TEST FOR SURE
        TEST    KB_FLAG,LEFT_SHIFT+RIGHT_SHIFT  ; ARE WE IN SHIFT STATE
        JNZ     K53                     ; IF SHIFTED, REALLY NUM STATE

;----- BASE CASE FOR KEYPAD

K49:                                    ; BASE-CASE
        CMP     AL,74                   ; SPECIAL CASE FOR A COUPLE OF KEYS
        JE      K50                     ; MINUS
        CMP     AL,78
        JE      K51
        SUB     AL,71                   ; CONVERT ORIGIN
        MOV     BX,OFFSET K15           ; BASE CASE TABLE
        JMP     SHORT K64               ; CONVERT TO PSEUDO SCAN
K50:
        MOV     AX,74*256+'-'           ; MINUS
        JMP     SHORT K57               ; BUFFER_FILL
K51:
        MOV     AX,78*256+'+'           ; PLUS
        JMP     SHORT K57               ; BUFFER_FILL

;----- MIGHT BE NUM LOCK, TEST SHIFT STATUS
K52:                                    ; ALMOST-NUM_STATE
        TEST    KB_FLAG,LEFT_SHIFT+RIGHT_SHIFT
        JNZ     K49                     ; SHIFTED TEMP OUT OF NUM STATE
K53:                                    ; REALLY_NUM_STATE
        SUB     AL,70                   ; CONVERT ORIGIN
        MOV     BX,OFFSET K14           ; NUM STATE TABLE
        JMP     SHORT K56               ; TRANSLATE_CHAR

;----- PLAIN OLD LOWER CASE

K54:                                    ; NOT-SHIFT
        CMP     AL,59                   ; TEST FOR FUNCTION KEYS
        JB      K55                     ; NOT-LOWER-FUNCTION
        MOV     AL,0                    ; SCAN CODE IN AH ALREADY
        JMP     SHORT K57               ; BUFFER_FILL
K55:                                    ; NOT-LOWER-FUNCTION
        MOV     BX,OFFSET K10           ; LC TABLE

;----- TRANSLATE THE CHARACTER

K56:                                    ; TRANSLATE-CHAR
        DEC     AL                      ; CONVERT ORIGIN
        XLAT    CS:K11                  ; CONVERT THE SCAN CODE TO ASCII

;----- PUT CHARACTER INTO BUFFER
```

```
K57:                                    ; BUFFER FILL
        CMP     AL,-1                   ; IS THIS AN IGNORE CHAR
        JE      K59                     ; YES, DO NOTHING WITH IT
        CMP     AH,-1                   ; LOOK FOR -1 PSEUDO SCAN
        JE      K59                     ; NEAR_INTERRUPT_RETURN

;----- HANDLE THE CAPS LOCK PROBLEM

K58:                                    ; BUFFER-FILL-NOTEST
        TEST    KB_FLAG,CAPS_STATE      ; ARE WE IN CAPS LOCK STATE
        JZ      K61                     ; SKIP IF NOT

;----- IN CAPS LOCK STATE

TEST    KB_FLAG,LEFT_SHIFT+RIGHT_SHIFT  ; TEST FOR SHIFT STATE
        JZ      K60                     ; IF NOT SHIFT, CONVERT LOWER TO UPPER

;----- CONVERT ANY UPPER CASE TO LOWER CASE

CMP     AL,'A'                  ; FIND OUT IF ALPHABETIC
        JB      K61                     ; NOT_CAPS_STATE
        CMP     AL,'Z'
        JA      K61                     ; NOT_CAPS_STATE
        ADD     AL,'a'-'A'              ; CONVERT TO LOWER CASE
        JMP     SHORT K61               ; NOT_CAPS_STATEK59:
K59:                                    ; NEAR-INTERRUPT-RETURN
        JMP     K26                     ; INTERRUPT_RETURN

;----- CONVERT ANY LOWER CASE TO UPPER CASE

K60:                                    ; LOWER-TO-UPPER
        CMP     AL,'a'                  ; FIND OUT IF ALPHABETIC
        JB      K61                     ; NOT_CAPS_STATE
        CMP     AL,'z'
        JA      K61                     ; NOT_CAPS_STATE
        SUB     AL,'a'-'A'              ; CONVERT TO UPPER CASE
K61:                                    ; NOT-CAPS-STATE
        MOV     BX,BUFFER_TAIL          ; GET THE END POINTER TO THE BUFFER
        MOV     SI,BX                   ; SAVE THE VALUE
        CALL    K4                      ; ADVANCE THE TAIL
        CMP     BX,BUFFER_HEAD          ; HAS THE BUFFER WRAPPED AROUND
        JE      K62                     ; BUFFER_FULL_BEEP
        MOV     [SI],AX                 ; STORE THE VALUE
        MOV     AL,BYTE2        ;x12/11 ; GET SECOND SCANCODE BYTE (LO-TIME)
        MOV     AH,BYTE3        ;x12/11 ; GET THIRD SCANCODE BYTE (HI-TIME)
        MOV     [SI+2],AX       ;x12/11 ; PUT THEM INTO KEYBOARD BUFFER
```

```
            MOV     BUFFER_TAIL,BX          ; MOVE THE POINTER UP
            JMP     K26                     ; INTERRUPT_RETURN

;----- BUFFER IS FULL, SOUND THE BEEPER

K62:                                        ; BUFFER-FULL-BEEP
            MOV     AL,EOI                  ; END OF INTERRUPT COMMAND
            OUT     20H,AL                  ; SEND COMMAND TO INT CONTROL PORT
            MOV     BX,080H                 ; NUMBER OF CYCLES FOR 1/12 SECOND TONE
            IN      AL,KB_CTL               ; GET CONTROL INFORMATION
            PUSH    AX                      ; SAVE

;----- TRANSLATE SCAN FOR PSEUDO SCAN CODES

K63:                                        ; TRANSLATE-SCAN
            SUB     AL,59                   ; CONVERT ORIGIN TO FUNCTION KEYS
K64:                                        ; TRANSLATE-SCAN-ORGD
            XLAT    CS:K9                   ; CTL TABLE SCAN
            MOV     AH,AL                   ; PUT VALUE INTO AH
            MOV     AL,0                    ; ZERO ASCII CODE
            JMP     K57                     ; PUT IT INTO THE BUFFER

KB_INT      ENDP

K65:                                        ; BEEP-CYCLE
            AND     AL,0FCH                 ; TURN OFF TIMER GATE AND SPEAKER DATA
            MOV     CX,48H                  ; HALF C  E TIME FOR TONE
K66:
            LOOP    K66                     ; SPEAKER OFF
            OR      AL,2                    ; TURN ON SPEAKER BIT
            OUT     KB_CTL,AL               ; OUTPUT TO CONTROL
            MOV     CX,48H                  ; SET UP COUNT
K67:
            LOOP    K67                     ; ANOTHER HALF CYCLE
            DEC     BX                      ; TOTAL TIME COUNT
            JNZ     K65                     ; DO ANOTHER CYCLE
            POP     AX                      ; RECOVER CONTROL
            OUT     KB_CTL,AL               ; OUTPUT THE CONTROL
            JMP     K27

ORG     0FF3EH          ;xxxxxx ; MAKE BIOS *identical*
DDS         PROC    NEAR
            PUSH    AX                      ; SAVE AX
            MOV     AX,DATA
            MOV     DS,AX                   ; SET DATA SEGMENT
            POP     AX                      ; RESTORE AX
            RET
```

DDS        ENDP

; STORAGE FOR ROM INTERRUPT VECTORS 9H AND 16H

ROM_VECTOR_16   DD                      ;xx12/9 ; KEYBOARD I/O VECTOR ADDRESS
ROM_VECTOR_9    DD                      ;xx12/9 ; KEYBOARD INT VECTOR ADDRESS

; PASCAL DEFINITION OF VECTOR CHANGING ROUTINE:
;
;        PROCEDURE LOAD_VS;
;            EXTERNAL;

LOAD_VS PROC    FAR

PUBLIC  LOAD_VS

ASSUME  CS:CODE,DS:DATA         ;xx12/3 ; ALLOW DS TO REFERENCE DATA

PUSH    BP                      ;xx12/9 ; SAVE PASCAL BP
        PUSH    AX                      ;xx12/8 ; AVE PASCAL AX
        PUSH    SI                      ;xx12/8 ; SAVE PASCAL SI
        PUSH    DS                      ;xx12/8 ; SAVE PASCAL DS

DEC     BYTE PTR [BP+6]         ;xx12/9 ; INT VECTORS STORE/RESTORE PAR
        JNZ     RESTORE_VEC             ;xx12/9 ; IF WAS 0, RESTORE INT VECTORS

; ARGUMENT = 1, SO INTIALIZE KEYBOARD BUFFER AND LOAD INTERRUPT VECTORS

MOV     AX,DATA                 ;xx12/3 ; PUT THE DATA SEGMENT
        MOV     DS,AX                   ;xx12/3 ;   INTO DS

;xx12/3 ; SEE PG. A-17 OF TECH-REF
        MOV     SI,OFFSET KB_BUFFER     ;xx12/3 ; SETUP NEW KEYBOARD PARAMS.
        MOV     BUFFER_HEAD,SI          ;xx12/3 ; INITIALIZE BUFFER_HEAD
        MOV     BUFFER_TAIL,SI          ;xx12/3 ; INTIALIZE BUFFER_TAIL
        MOV     BUFFER_START,SI         ;xx12/3 ; INITIALIZE BUFFER_START
        ADD     SI,64                   ;xx12/3 ; ALLOW FOR 16 4-BYTE QUANTIES.
        MOV     BUFFER_END,SI           ;xx12/3 ; INTIALIZE BUFFER_END

ASSUME  DS:KEYBOARD_VECTORS

MOV     AX,KEYBOARD_VECTORS             ; PUT THE KEYBOARD_VECTORS
        MOV     DS,AX                           ;   SEGMENT INTO DS

; FIRST SAVE THE CURRENT KEYBOARD INTERRUPT VECTORS

```
        MOV     AX,VECTOR_9             ;xx12/9 ; SAVE ADDRESS OF ROM
        MOV     ROM_VECTOR_9,AX         ;xx12/9 ;   KEYBOARD I/O VECTOR
        MOV     AX,VECTOR_9[2]          ;xx12/9 ;
        MOV     ROM_VECTOR_9[2],AX      ;xx12/9 ;

MOV     AX,VECTOR_16            ;xx12/9 ; SAVE ADDRESS OF ROM
        MOV     ROM_VECTOR_16,AX        ;xx12/9 ;   KEYBOARD INTERRUPT VECTOR
        MOV     AX,VECTOR_16[2]         ;xx12/9 ;
        MOV     ROM_VECTOR_16[2],AX     ;xx12/9 ;

; NOW RESET THESE VECTORS TO POINT TO OUR KEYBOARD ROUTINES

MOV     AX,OFFSET KB_INT                ; RESET THE INT 9 VECTOR TO
        MOV     VECTOR_9,AX                     ;   POINT TO KB_INT; FIRST
        MOV     VECTOR_9[2],CS                  ;   OFFSET, THEN SEGMENT

MOV     TOR_16,AX                       ;   POINT TO KEYBOARD_IO; FIRST
        MOV     VECTOR_16[2],CS                 ;   .FFSET, THEN SEGMENT
        JMP     SHORT FINISH_UP         ;xx12/9 ; JUMP AROUND VECTOR RESTORE

; ARGUMENT = 0, SO RESTORE KEYBOARD VECTORS WITH ORIGINAL ROM ADDRESSES

RESTORE_VEC:                            ;xx12/9 ; RESTORE ORIGINAL KEYBD INTS

MOV     AX,KEYBOARD_VECTORS     ;xx12/9 ; PUT THE KEYBOARD_VECTORS
        MOV     DS,AX                   ;xx12/9 ;   SEGMENT INTO DS

MOV     AX,ROM_VECTOR_9         ;xx12/9 ; RESTORE ADDRESS OF ROM
        MOV     VECTOR_9,AX             ;xx12/9 ;   KEYBOARD I/O VECTOR
        MOV     AX,ROM_VECTOR_9[2]      ;xx12/9 ;
        MOV     VECTOR_9[2],AX          ;xx12/9 ;

MOV     AX,ROM_VECTOR_16        ;xx12/9 ; RESTORE ADDRESS OF ROM
        MOV     VECTOR_16,AX            ;xx12/9 ;   KEYBOARD INTERRUPT VECTOR
        MOV     AX,ROM_VECTOR_16[2]     ;xx12/9 ;
        MOV     VECTOR_16[2],AX         ;xx12/9 ;

FINISH_UP:
        POP     DS                      ;xx12/8 ; RESTORE PASCAL DS
        POP     SI                      ;xx12/8 ; RESTORE PASCAL SI
        POP     AX                      ;xx12/8 ; RESTORE PASCAL AX
        POP     BP                      ;xx12/9 ; RESTORE PASCAL BP

RET                             ;xx12/8 ; RETURN TO PASCAL
```

LOAD_VS ENDP

CODE ENDS

We claim:
1. A keyboard entry system for a selected language, said system comprising:
   a keyboard comprising a plurality of keys, said plurality of keys comprising a set of letter keys comprising a respective key for each letter of said selected language;
   first means, responsive to the plurality of letter keys, for generating keying signals in response to activation of the letter keys, each keying singal characterized by a respective activation time;
   second means, responsive to the first means, for generating output signals in response to the keying signals, said second means comprising:
      means for classifying a plurality of keying signals as a key chord in the event the respective activation times satisfy predetermined criteria, said classifying means comprising;
      means for setting a time threshold value prior to initiation of a typing session in said selected language;
      means for comparing an elapsed time separating the activation times of a pair of the keying signals included in the plurality of keying signals with said time threshold value; and
      means for designating said plurality of keying signals as a key chord in the event a selected one of the elapsed time and the time threshold value is greater than the other;
   means for storing a list of stored texts, each corresponding to a respective chord;
   means, responsive to the key chord for utilizing the keying signals associated with the key chord to select the one of the stored texts in the list of stored texts which correspond to the key chord;
   means for setting the output signal to correspond to the selected one of the stored text and
   means fot setting the output signal to correspond to the letters corresponding to the activated letter keys in the event the respective activation times fail to satisfy said criteria.
2. The invention of claim 1 wherein the selected language is written in the Roman alphabet and said set of letter keys comprises a respective letter key for each letter of the Roman alphabet.
3. The invention of claim 1 wherein the keyboard comprises a QWERTY keyboard which comprises the plurality of letter keys.
4. The invention of claim 1 wherein the means for generating the keying signals generates a keying signal in response to release of a depressed one of the letter keys.
5. A keyboard entry system for a selected language which comprises a multiplicity of words formed of the 26 letters of the Roman alphabet, said system operative to supply a plurality of output signals to a utilization device and comprising:
   a keyboard comprising a plurality of keys, said plurality of keys comprising at least 26 letter keys, each corresponding to an associated one of the 26 letters of the Roman alphabet, said letter keys arranged in a QWERTY keyboard configuration;
   means, responsive to the letter keys, for generating key signals in response to activation of the letter keys, each of said key signals comprising a key code identifying the activated key and a time code identifyign the time of activation;
   means, responsive to the key signals, for classifying a plurality of key codes activated during during a typing session as a key chord in the event the time codes of the corresponding plurality of key signals satisfy predetermined criteria and for classifying the plurality of key codes as a plurality of discrete letters in the event the time codes of the corresponding plurality of key signals fail to satisfy the predetermined criteria, said predetermined criteria comprising the component criterion that a selected one of (1) the elapsed time separating the time codes of a pair of the key signals incuded in the plurality of key signals, and (2) a time threshold value set prior to initiation of the typing session must be greater than the other;
   means for supplying the plurality of discrete letters as a plurality of the output signals;
   means for maintaining a list of stored texts, each of which is identified with a respective stored index;
   means, responsive to the key chord, for comparing the key chord with the stored indexes and for selecting the corresponding one of the stored tests in the event the key chord matches one of the stored indexes; and
   means for supplying the selected stored text as one of the output signals, said system cooperating to allow conventional sequential key entry to bve intermixed iwth chorded key entry.
6. The invention of claim 5 wherein the time code has a time increment no less than 10 milliseconds.
7. The invention of claim 5 wherein the means for generating the key signals is included in the keyboard.
8. The invention of claim 5 wherein the classifying means is included in a computer, and wherein the means for generating the key signals is included in a module interconnected between the keyboard and the computer.
9. A keyboard entry system for a language comprised of a plurality of letters, said system comprising:
   a keyboard comprising a plurality fo letter keys, each associated with a respective letter;
   first means, responsive to the letter keys, for generating keying signals in response to activation of the letter keys;
   second means, responsive to the first means, for generating output signals in response to the keying signals, said second means comprising:
   means for storing a list of stored texts, each of which is associated with a respective stored index;
   means for setting a time threshold value prior to initiation of a typing session in said language;
   means for measuring a plurality of time intervals, each characteristic of the elapsed time separating a consecutive pair of keying signals;
   third means for classifying a set of keying signals as a nonchord in the event the one of (1) the respective time intervalls and (2) the time threshold value is greater than the other, and for setting the output signal to correspond to respective ones of the letters corresponding to the acitvated ones of the letter keys;

fourth means for classifying the set of keying signals as a key chord in the event that the other of (1) the respective time intervals and (2) the time threshold value is greter than the other;

means, responsive to the key chord, for comparing the key chord iwth the stored indexes and for selecting the corresponding one of the stored texts in the event the key chord matches one of the stored indexes; and means for setting the output signal to correspond with the selected stored text;

said keyboard and first and second means cooperating automatically to set the output signal to correspond to associated one of the letters in response to nonchorded activation of the letter keys, and to set the output signal to correspond to an associated one of the stored texts in response to chorded activation of the letter keys.

10. The invention of claim 9 wherein the plurality of letter keys comprises a respective letter key for each of the 26 letters of the Roman Alphabet.

11. The invention of claim 9 wherein the keyboard comprises a QWERTY keyboard which includes the plurality of letter keys.

12. The invention of claim 9 wherein the means for generating the keying signals generates a keying signal in response to release of a depressed one of the letter keys.

13. The invention of claim 1 further comprising means, controllable by a user, for adjusting the time threshold value prior to initiation of the typing session in said selected language.

14. The invention of claim 1 wherein the time threshold value remains unchanged during the typing session in said selected language.

15. The invention of claim 1 wherein the activation times of the pair of the keying signals are indicative of respective key depression tiems, and wherein the designating means designates the plurality of keying signals as a key chord in the event the time threshold value is greater than the elapsed time.

16. The invention of claim 5 further comprising means, controllable by a user, for adjusting the time threshold value prior ot initiation of the typing session.

17. The invention of claim 5 wherein the time threshold value remains unchanged during the typing session.

18. The invention of claim 5 wherein the time codes of the pair of key signals identify the respective times of key depression, and wherein the componetn criterion requires that the time threshold value must be greater than the elapsed time to classify the plurality of key codes as a key chord.

19. The invention of claim 9 wherein the setting means comprises means, controllable by a user, for adjusting the time threshold value prior to initiation of the typing session in said language.

20. The invention of claim 9 wherein the time threshold value remains unchanged during the typing session in said language.

21. The invention of claim 18 wherein the time threshold value is a variable, the value of which is user selectable.

22. The invention of claim 9 wherein the first means generates the keying signals in response to key depression and wherein the fourth means classifies the set of keying signals as a key chord in the event the time threshold value is greater than the respective time intervals.

* * * * *

UNITED STATES PATENT AND TRADEMARK OFFICE
CERTIFICATE OF CORRECTION

PATENT NO. : 4,638,306
DATED : Jan. 20, 1987
INVENTOR(S) : Philip Rollhaus et al.

It is certified that error appears in the above-identified patent and that said Letters Patent is hereby corrected as shown below:

IN THE BACKGROUND OF THE INVENTION

In column 1, line 18, please insert --a-- before the word "special";

In column 1, line 48, please delete "disclses" and substitute therefor --discloses--;

In column 1, line 59, please delete "entry a number" and substitute therefor --enter a number--.

IN THE DETAILED DESCRIPTION OF
THE PRESENTLY PREFERRED EMBODIMENTS

In column 3, lines 21-22, please delete "programmed" and substitute therefor --program--;

In column 3, line 53, please delete "complier" and substitute therefor --compiler--;

In column 5, line 27, after the word "system" please insert the following:

--50. As shown in FIG. 3,
the chord recognition system--

In column 5, line 34, please delete "if" and substitute therefor --If--;

UNITED STATES PATENT AND TRADEMARK OFFICE
CERTIFICATE OF CORRECTION

PATENT NO. : 4,638,306
DATED : Jan. 20, 1987
INVENTOR(S) : Philip Rollhaus et al.

It is certified that error appears in the above-identified patent and that said Letters Patent is hereby corrected as shown below:

In column 5, line 56, please delete "alternatley" and substitute therefor --alternately--;

In column 6, line 34, please delete "unstructed" and substitute therefor --unstructured--;

In column 6, line 54, please insert the word --release-- after the word "key".

IN THE CLAIMS

In Claim 1 (column 59, line 16), please delete "singal" and substitute therefor --signal--;

In Claim 5 (column 60, line 11), please delete "identifyign" and substitute therefor --identifying--;

In Claim 5 (column 60, line 13), please delete one of the two words "during";

In Claim 5 (column 60, line 38), please delete "bve" and substitute therefor --be--;

In Claim 5 (column 60, line 39), please delete "iwth" and substitute therefor --with--;

In Claim 9 (column 60, line 52), please delete "fo" and substitute therefor -of--;

UNITED STATES PATENT AND TRADEMARK OFFICE
CERTIFICATE OF CORRECTION

PATENT NO. : 4,638,306
DATED : Jan. 20, 1987
INVENTOR(S) : Philip Rollhaus et al.

Page 3 of 3

It is certified that error appears in the above-identified patent and that said Letters Patent is hereby corrected as shown below:

In Claim 9 (column 61, line 1), please delete "the one of" and substitute therefor --that one of--;

In Claim 9 (column 61, line 2), please delete "intervalls" and substitute therefor --intervals--;

In Claim 9 (column 61, line 5), please delete "acitvated" and substitute therefor --activated--;

In Claim 9 (column 61, line 12), please delete "iwth" and substitute therefor --with--;

In Claim 15 (column 62, line 6), please delete "tiems" and substitute therefor --times--;

In Claim 16 (column 62, line 12), please delete "ot" and substitute therefor --to--;

In Claim 18 (column 62, line 17), please delete "componetn" and substitute therefor --component--.

Signed and Sealed this

Seventh Day of June, 1988

Attest:

DONALD J. QUIGG

Attesting Officer

Commissioner of Patents and Trademarks